United States Patent [19]
Romano et al.

[11] Patent Number: 5,477,103
[45] Date of Patent: Dec. 19, 1995

[54] SEQUENCE, TIMING AND SYNCHRONIZATION TECHNIQUE FOR SERVO SYSTEM CONTROLLER OF A COMPUTER DISK MASS STORAGE DEVICE

[75] Inventors: Paul M. Romano; Larry D. King; Mike Machado, all of Boulder, Colo.; Petro Estakhri, Pleasanton, Calif.; Son Ho, Sunnyvale, Calif.; Phuc Tran; Maryam Imam, both of Fremont, Calif.

[73] Assignee: Cirrus Logic, Inc., Fremont, Calif.

[21] Appl. No.: 72,135

[22] Filed: Jun. 4, 1993

[51] Int. Cl.⁶ .................................................. G05B 19/29
[52] U.S. Cl. .................... 318/601; 318/560; 318/603; 318/608; 318/636; 360/77.08; 360/78.04
[58] Field of Search ........................... 318/569, 600–603, 318/606, 608, 632–633, 636; 360/77.01, 77.02, 78.01, 75, 78.04–78.14

[56] References Cited

U.S. PATENT DOCUMENTS

| | | | |
|---|---|---|---|
| 4,133,011 | 1/1979 | Kurzwell, Jr. ................. | 318/638 X |
| 4,514,667 | 4/1985 | Sakmann et al. ................ | 318/254 |
| 4,544,968 | 10/1985 | Anderson et al. ............... | 360/78 |
| 4,564,794 | 1/1986 | Kilen et al. .................. | 318/608 X |
| 4,575,776 | 3/1986 | Stephens et al. ............... | 360/78 |
| 4,578,723 | 3/1986 | Betts et al. ................... | 360/77 |
| 4,590,526 | 5/1986 | Laatt et al. ................... | 360/78 |
| 4,594,622 | 6/1986 | Wallace ....................... | 360/77 |
| 4,598,327 | 7/1986 | Jen et al. ..................... | 360/77 |
| 4,616,276 | 10/1986 | Workman ...................... | 360/77 |
| 4,658,308 | 4/1987 | Sander, Jr. .................... | 360/74.1 |
| 4,669,004 | 5/1987 | Moon et al. .................... | 360/77 |
| 4,679,102 | 7/1987 | Wevers et al. .................. | 360/75 |
| 4,679,103 | 7/1987 | Workman ...................... | 360/77 |
| 4,691,152 | 9/1987 | Ell et al. ..................... | 318/616 |
| 4,697,127 | 9/1987 | Stich et al. ................... | 318/561 |
| 4,783,705 | 11/1988 | Moon et al. . | |
| 4,812,929 | 3/1989 | Stewart et al. ................. | 360/77.07 |
| 4,814,909 | 3/1989 | Brown et al. . | |
| 4,816,941 | 3/1989 | Edel et al. .................... | 360/78.12 |
| 4,831,469 | 5/1989 | Hanson et al. .................. | 360/75 |
| 4,831,470 | 5/1989 | Brunnett et al. ................ | 360/75 |
| 4,835,632 | 5/1989 | Shih et al. .................... | 360/78.04 |
| 4,835,633 | 5/1989 | Edel et al. .................... | 360/78.12 |
| 4,876,491 | 10/1989 | Squires et al. ................. | 318/138 |
| 4,894,599 | 1/1990 | Ottesen et al. ................. | 318/636 |

(List continued on next page.)

OTHER PUBLICATIONS

Design of an Analog–8–Bit 2 channel I/O ASIC for disk drive control Applications, 1989 IEEE, by Phillip Quinlan, pp. 11.2.1–11.2.4.

Design and Operation of a fully Integrated BC/DMOS Head Actuator P/C for Computer Hard–Disk Drive by Williams et al., IEEE 1991 publication, pp. 1590–1599.

*Primary Examiner*—David S. Martin
*Attorney, Agent, or Firm*—John R. Ley; William J. Kubida; Howard H. Sheerin

[57] ABSTRACT

A servo system controller for a disk drive device which includes a rotating mass storage disk incorporates a timing error determining circuit for determining rotational speed variations in the disk from information contained in a servo field recorded in a track. A timing error signal is supplied when the speed variation exceeds a threshold, thus indicating an unacceptable level of speed variation. A digital synchronizer responds to asynchronous servo data signals from the disk to establish a cell clock signal occurring about a normal frequency, a cell during which only one servo data signal will occur, and a cell data signal which occurs during the cell. The cell clock signal clocks logical operations on a synchronous basis, and servo data signals are reliably captured. A concurrence determining circuit determines the degree of concurrence between the predetermined series of cell data signals and an actual pattern of signals derived from the servo field, and recognizes the servo control information from less than complete concurrence of the derived pattern and the actual expected pattern. Normal operation is permitted even through slight inconsistences may be detected, improving data throughput while still achieving an adequate level of error tolerance.

43 Claims, 22 Drawing Sheets

U.S. PATENT DOCUMENTS

| | | | |
|---|---|---|---|
| 4,896,240 | 1/1990 | Moriya et al. | 360/135 |
| 4,914,644 | 4/1990 | Chen et al. | 360/78.09 |
| 4,922,169 | 5/1990 | Freeman | 318/254 |
| 4,924,160 | 5/1990 | Tung | 318/561 |
| 4,928,043 | 5/1990 | Plunkett | 318/254 |
| 4,933,786 | 6/1990 | Wilson | 360/78.14 |
| 4,933,795 | 6/1990 | Nigam . | |
| 4,937,689 | 6/1990 | Seaver et al. | 360/78.07 |
| 4,967,291 | 10/1990 | Touchton et al. | 360/78.04 |
| 4,979,055 | 12/1990 | Squires et al. | 360/69 |
| 4,979,056 | 12/1990 | Squires et al. | 360/69 |
| 4,982,296 | 1/1991 | Brown et al. . | |
| 4,985,793 | 1/1991 | Anderson | 360/105 |
| 4,992,710 | 2/1991 | Cassat | 318/254 |
| 5,001,405 | 3/1991 | Cassat | 318/254 |
| 5,028,852 | 7/1991 | Dunfield | 318/254 |
| 5,057,753 | 10/1991 | Leuthold et al. | 318/254 |
| 5,111,349 | 5/1992 | Moon . | |
| 5,170,299 | 12/1992 | Moon . | |
| 5,187,619 | 2/1993 | Sidman . | |
| 5,291,355 | 3/1994 | Hatch et al. . | |

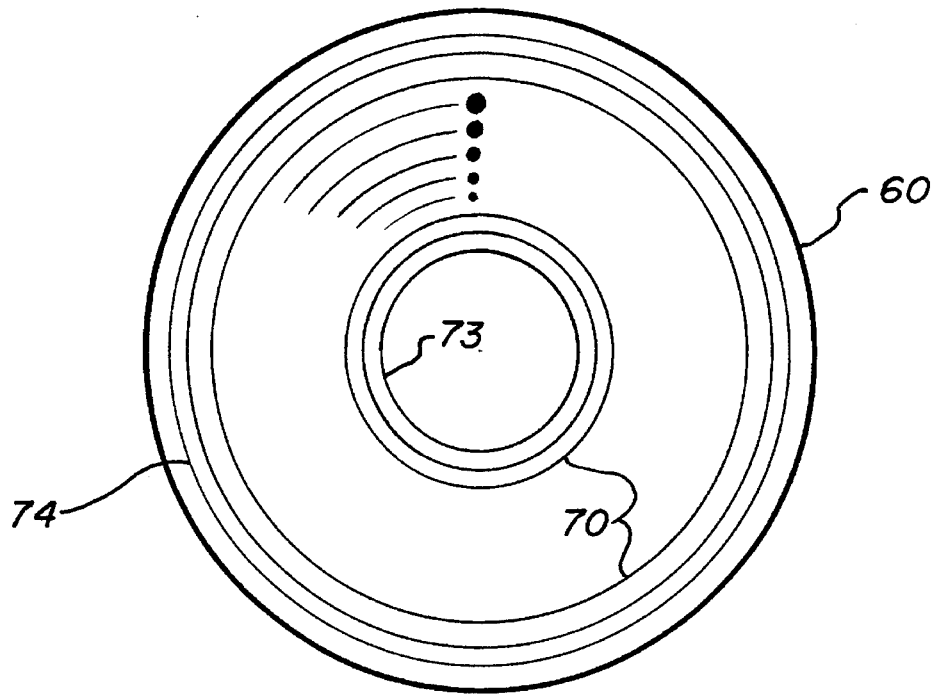
Fig_2
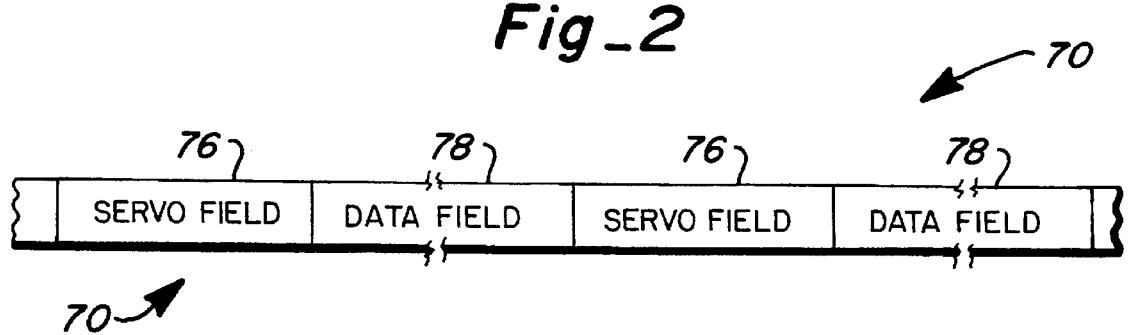
Fig_3
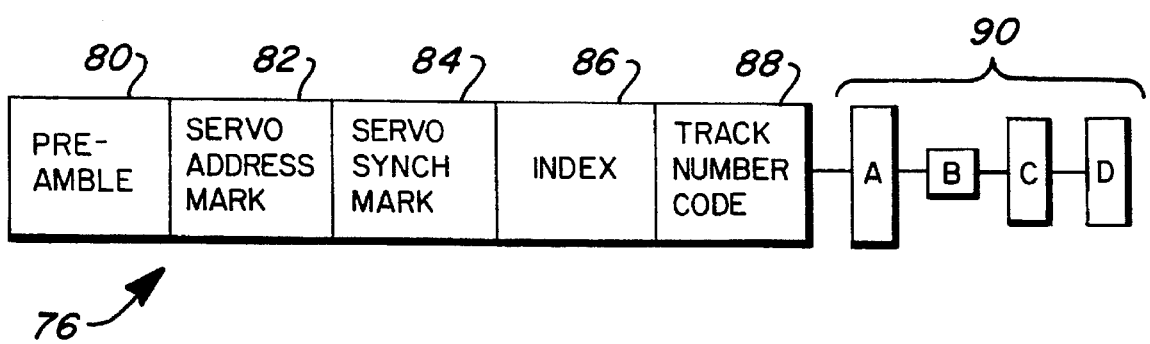
Fig_4

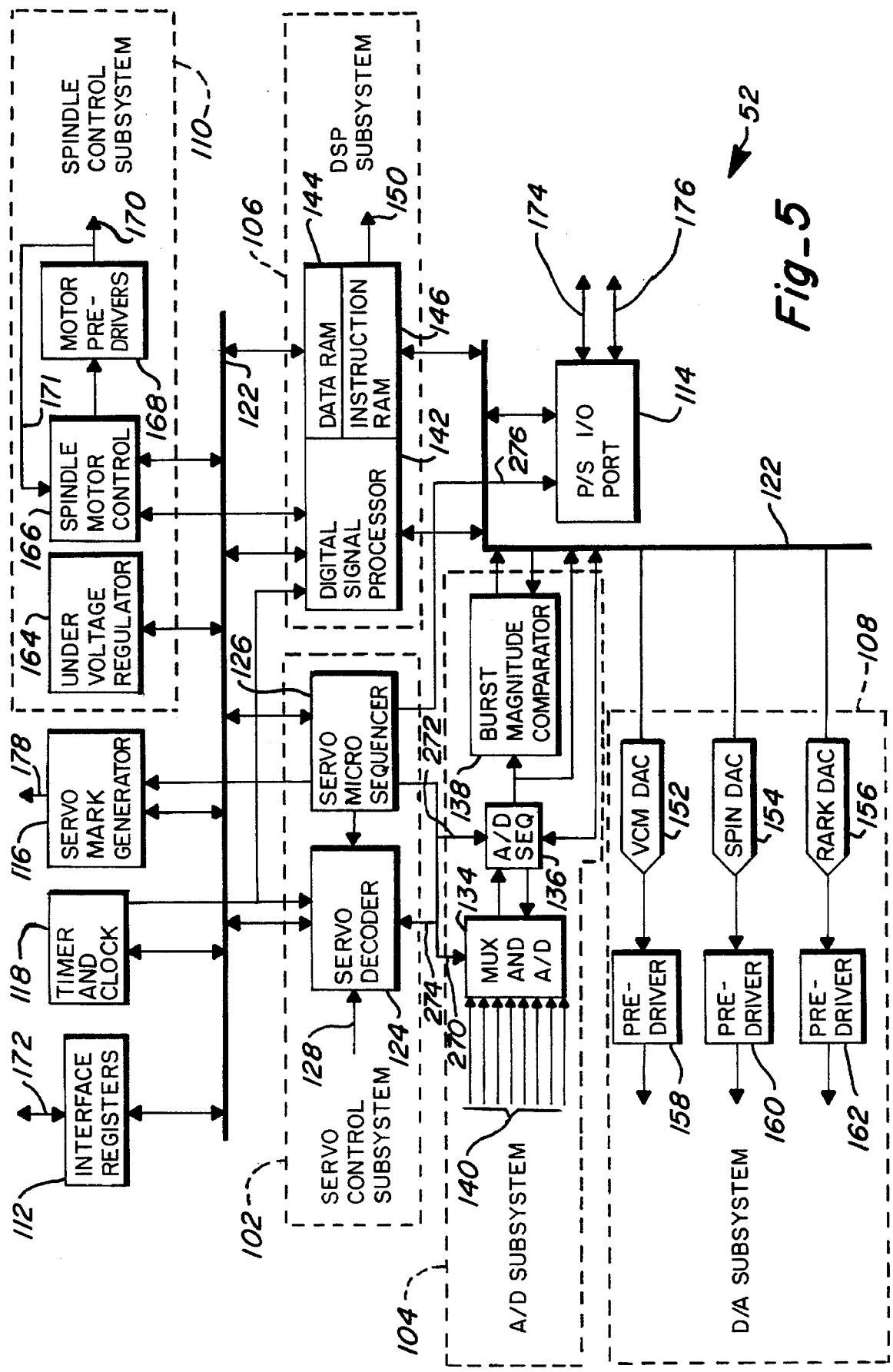

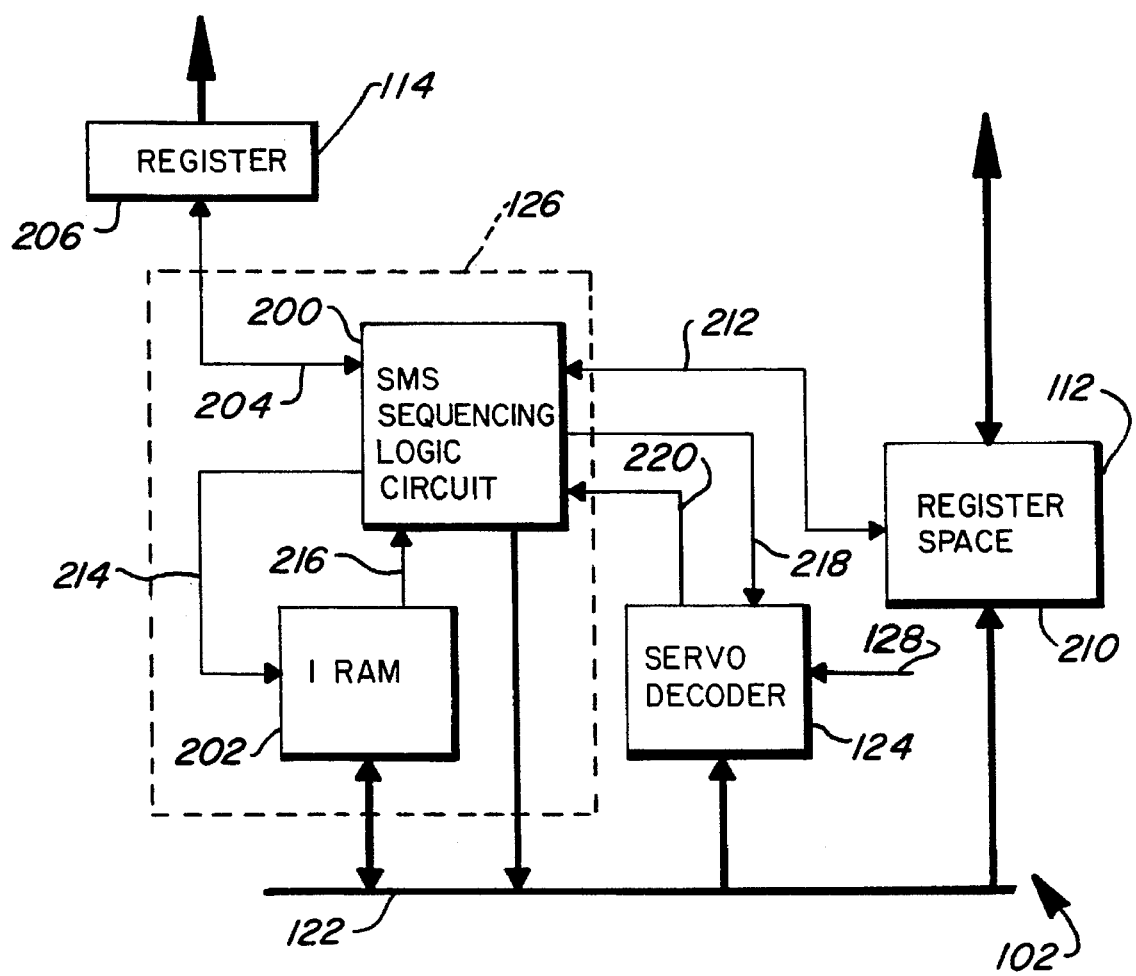
Fig_6
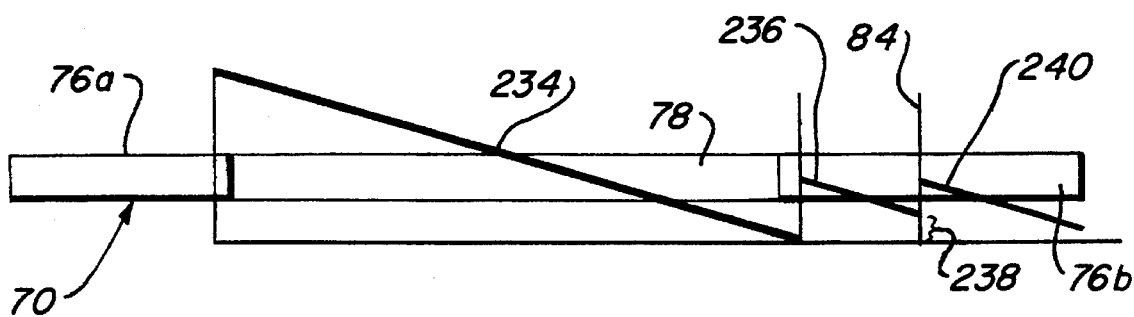
Fig_8

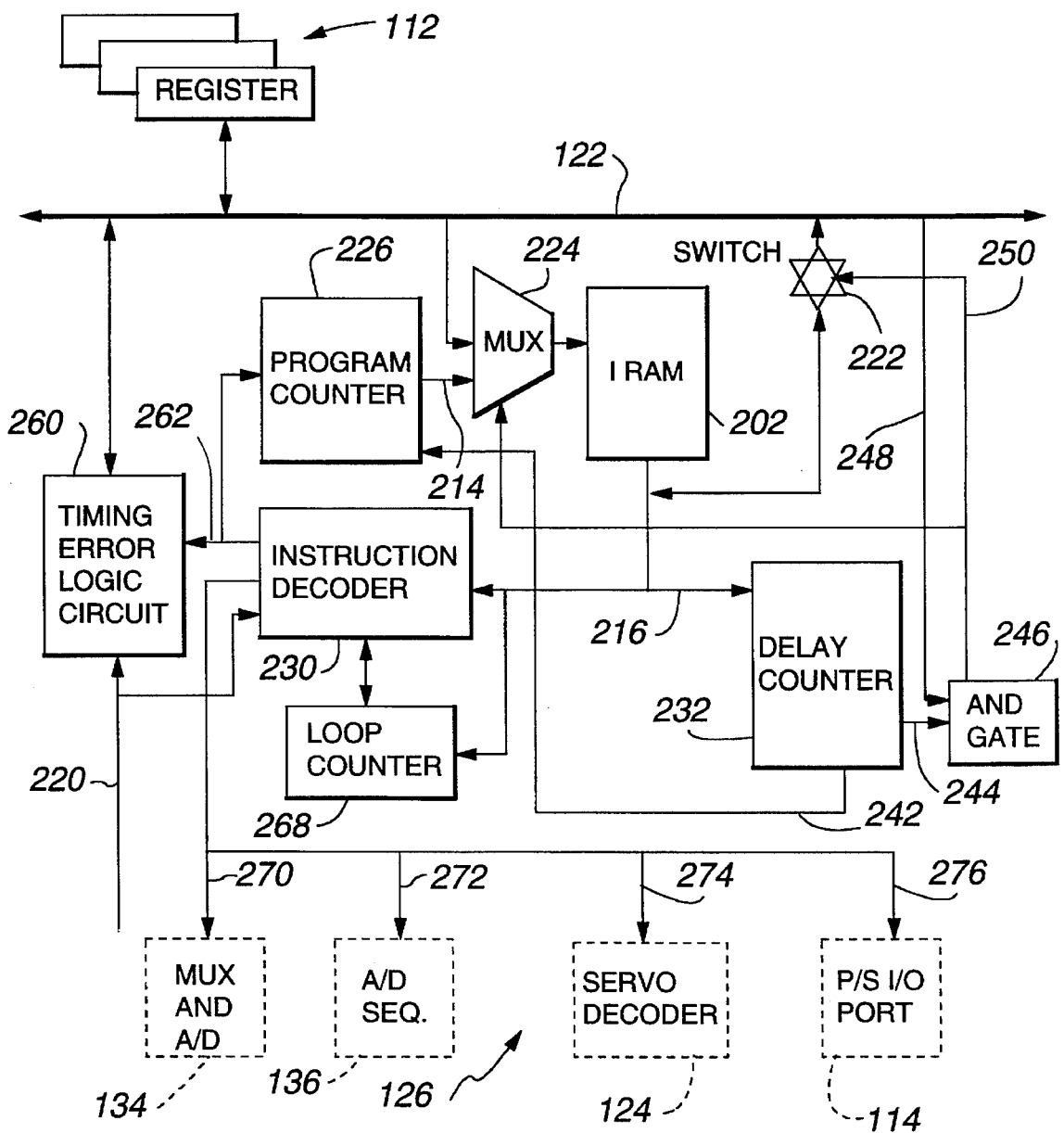
Fig_7

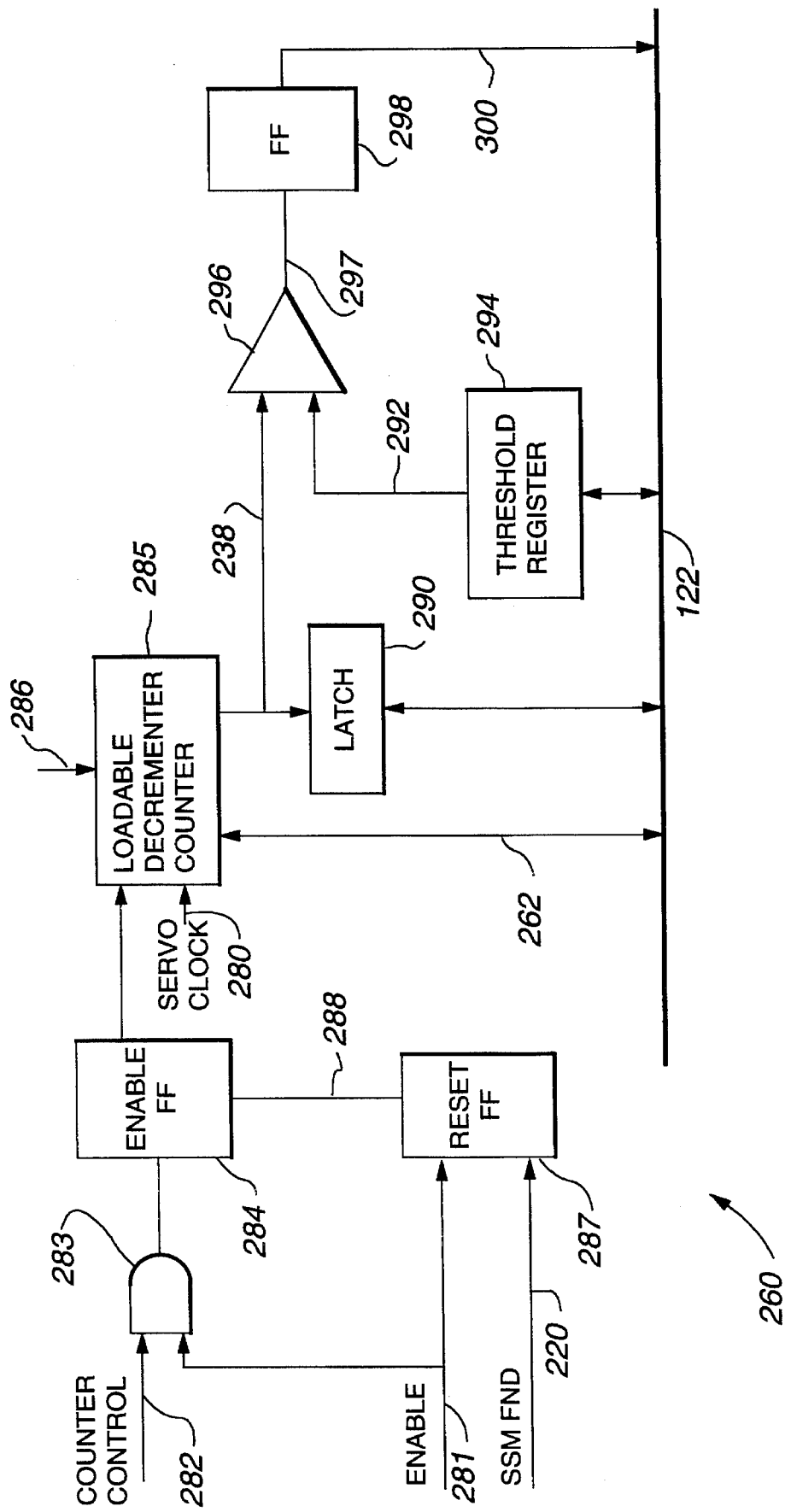
Fig_9

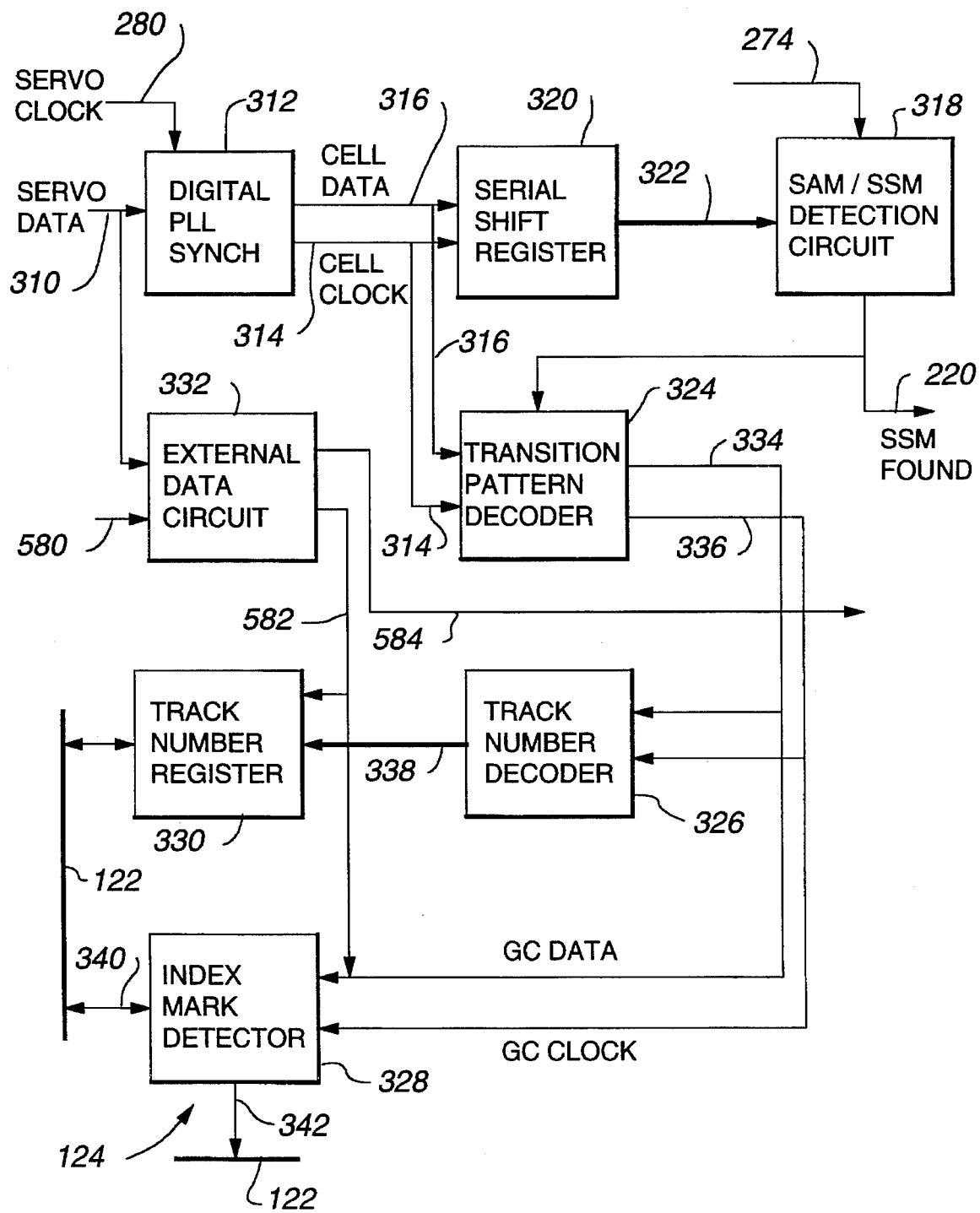
Fig_10

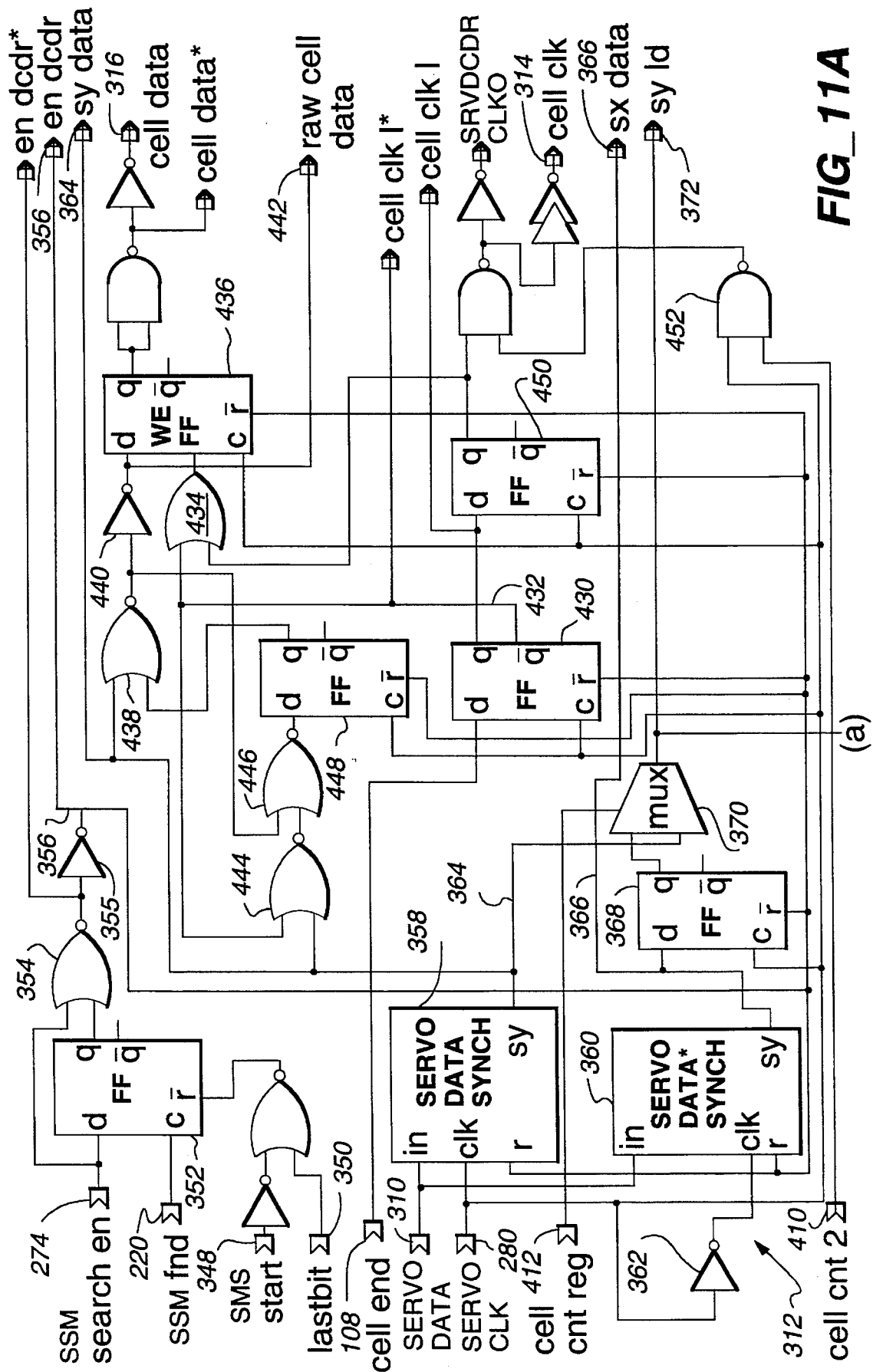
FIG_11A

 SERVO DATA
 CELL DATA
 WINDOW
 CELL CLOCK
 CELL END
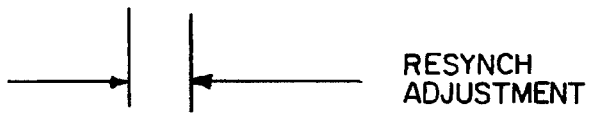 RESYNCH ADJUSTMENT
 SERVO DATA
 CELL DATA
 WINDOW
 CELL CLOCK
 CELL END

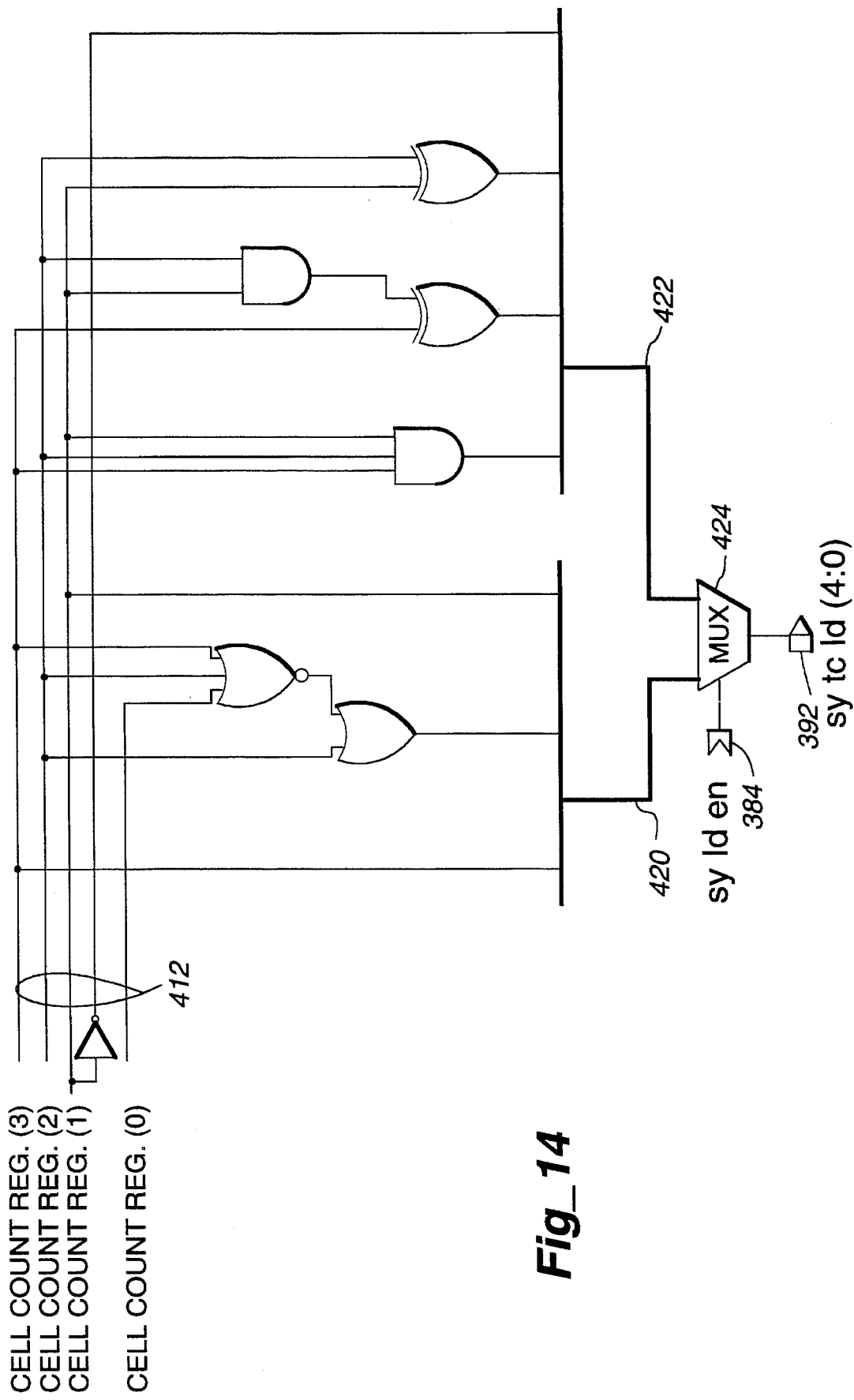
Fig_14

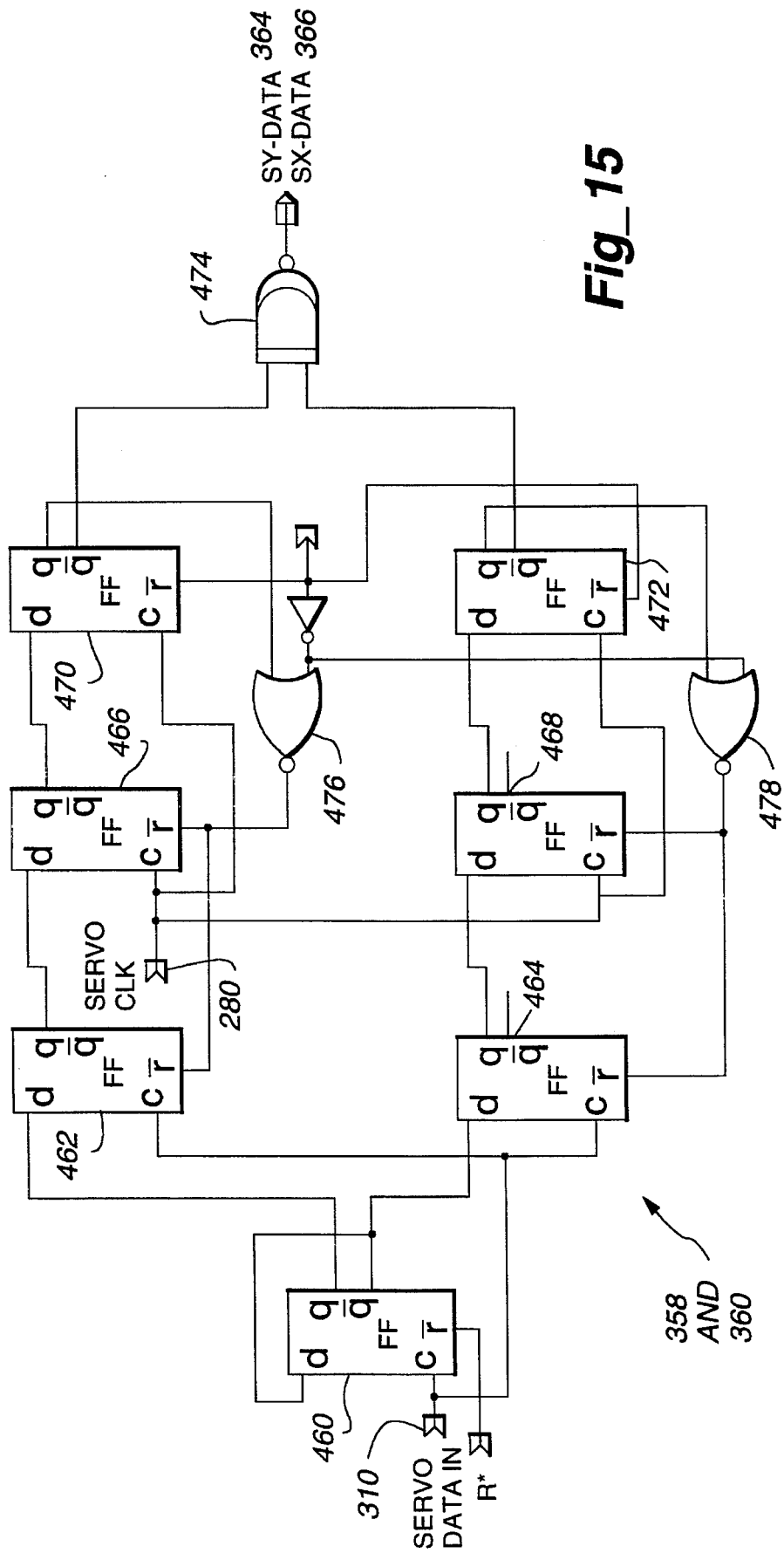
Fig_15

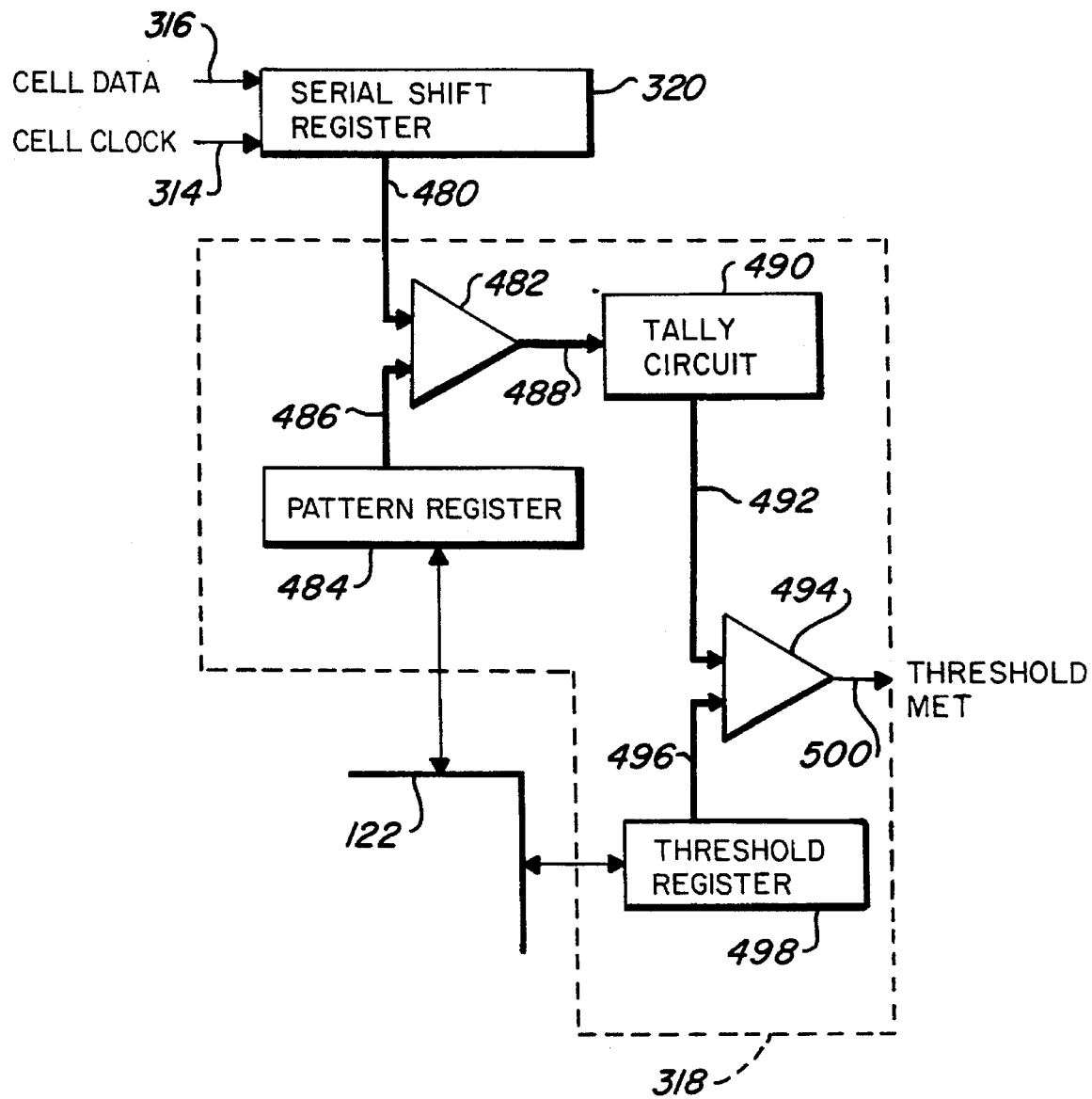
Fig_16

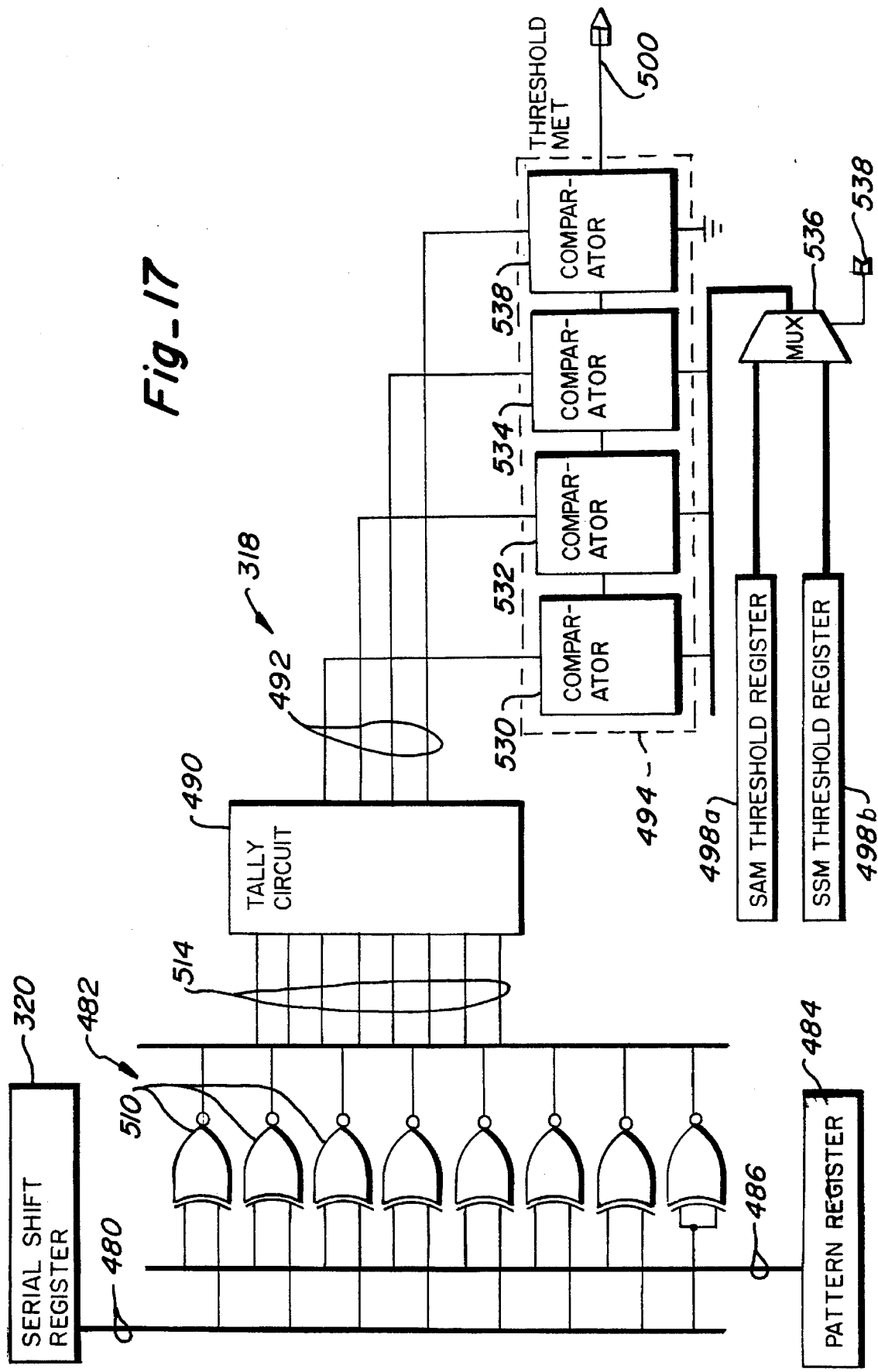
Fig_17

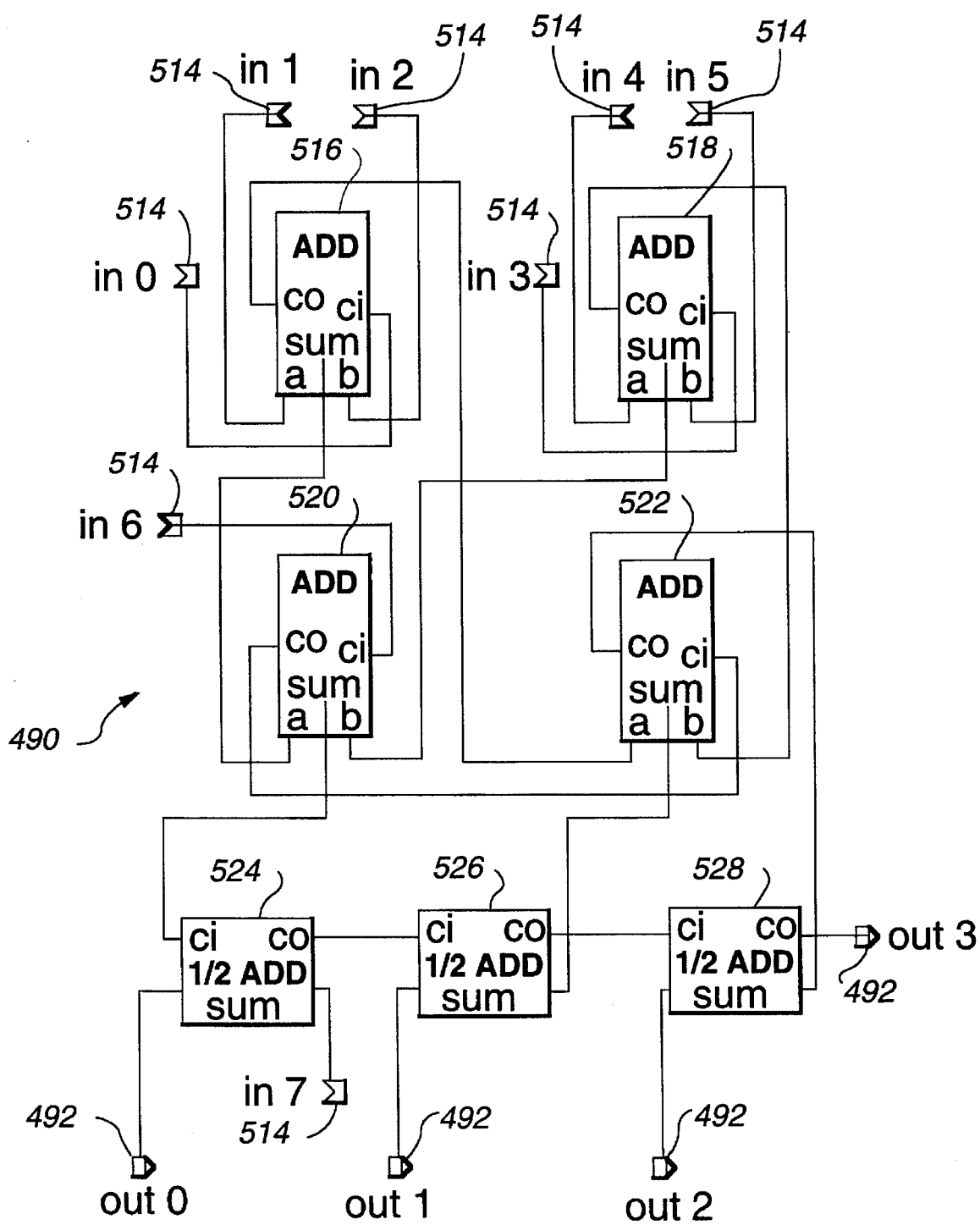
Fig _ 18

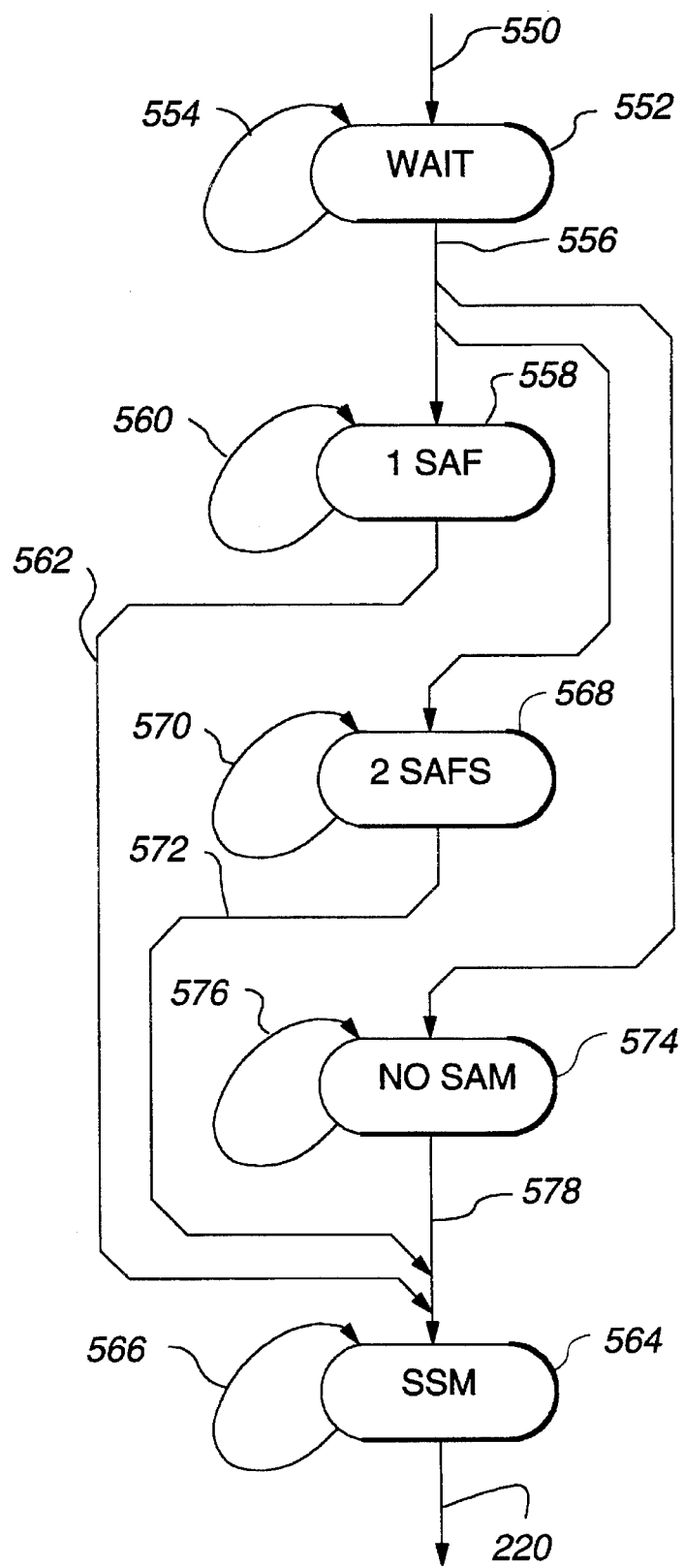
Fig_19

| TRACK NUMBER | CODE |
|---|---|
| 000 | 1111 |
| 001 | 1110 |
| 010 | 1010 |
| 011 | 1011 |
| 100 | 1001 |
| 101 | 1101 |
| 110 | 0101 |
| 111 | 0111 |

TRANSITION PATTERN

*Fig_20*

| TRACK NUMBER | CODE |
|---|---|
| 000 | 000 |
| 001 | 001 |
| 010 | 011 |
| 011 | 010 |
| 100 | 110 |
| 101 | 111 |
| 110 | 101 |
| 111 | 100 |

*Fig_21*

| TRACK NUMBER | CODE | TRANSITION PATTERN |
|---|---|---|
| 000 | 000 | |
| 001 | 001 | |
| 010 | 011 | |
| 011 | 010 | |
| 100 | 110 | |
| 101 | 111 | |
| 110 | 101 | |
| 111 | 100 | |

*Fig_22*

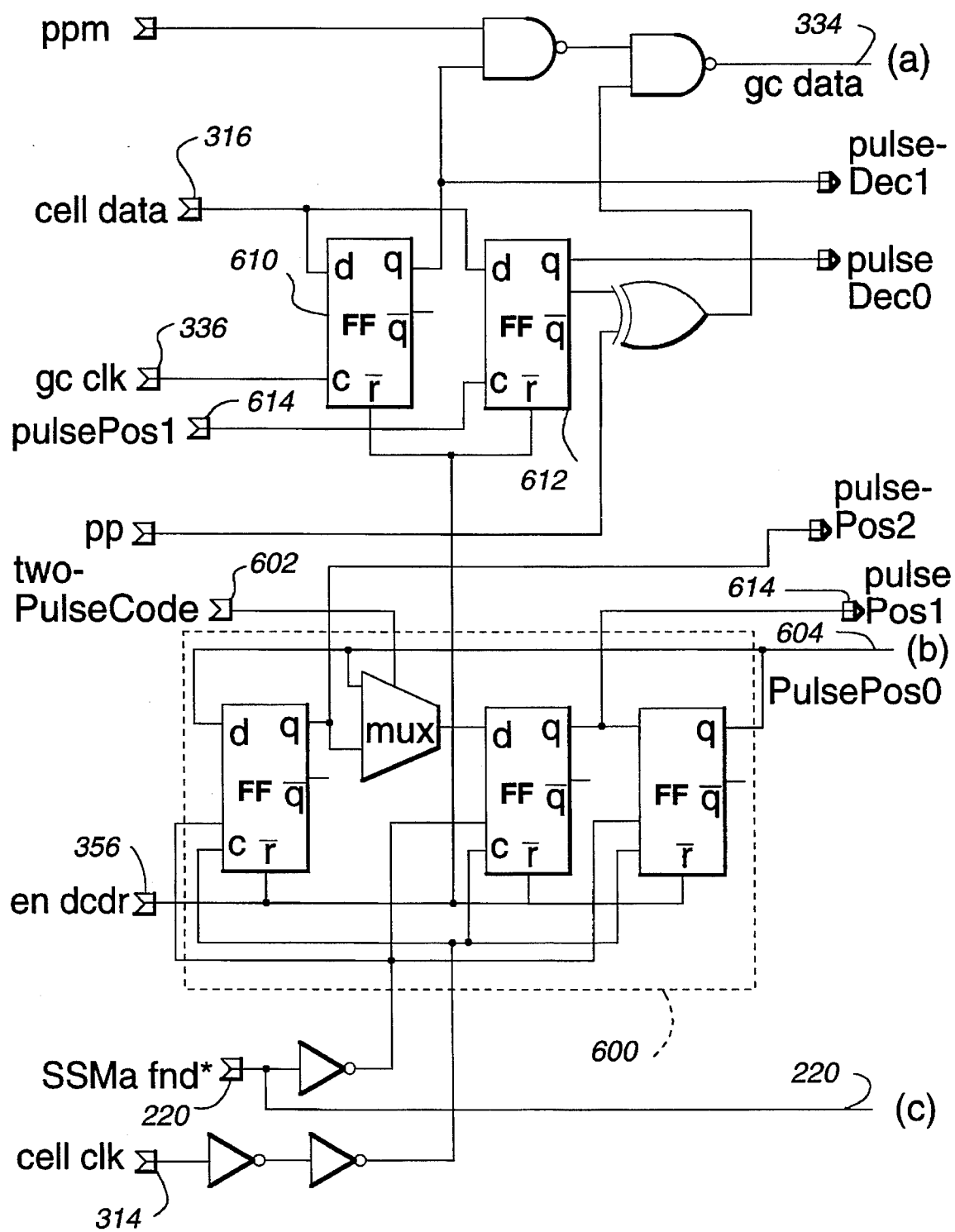
Fig_23A

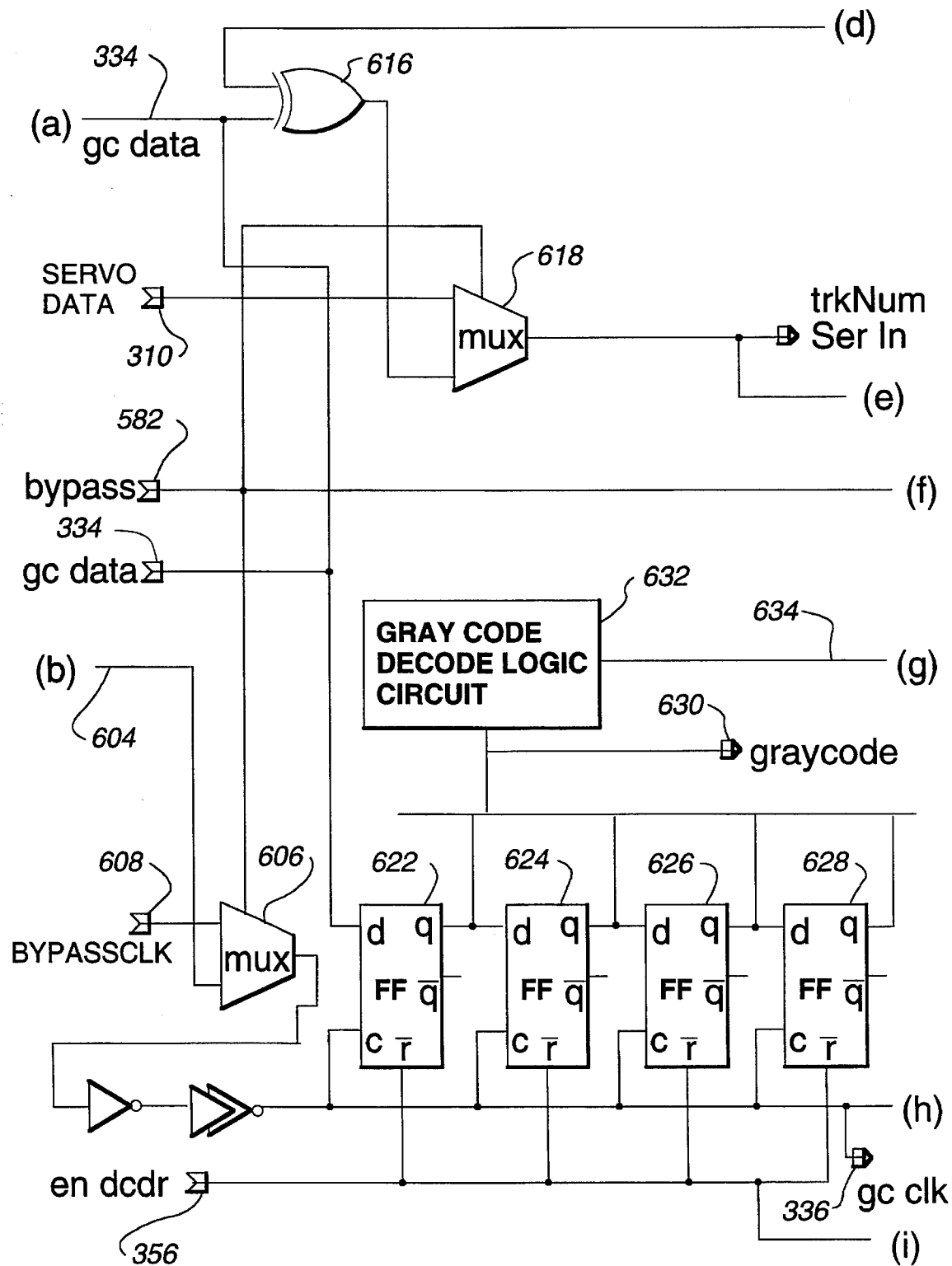
Fig_23B

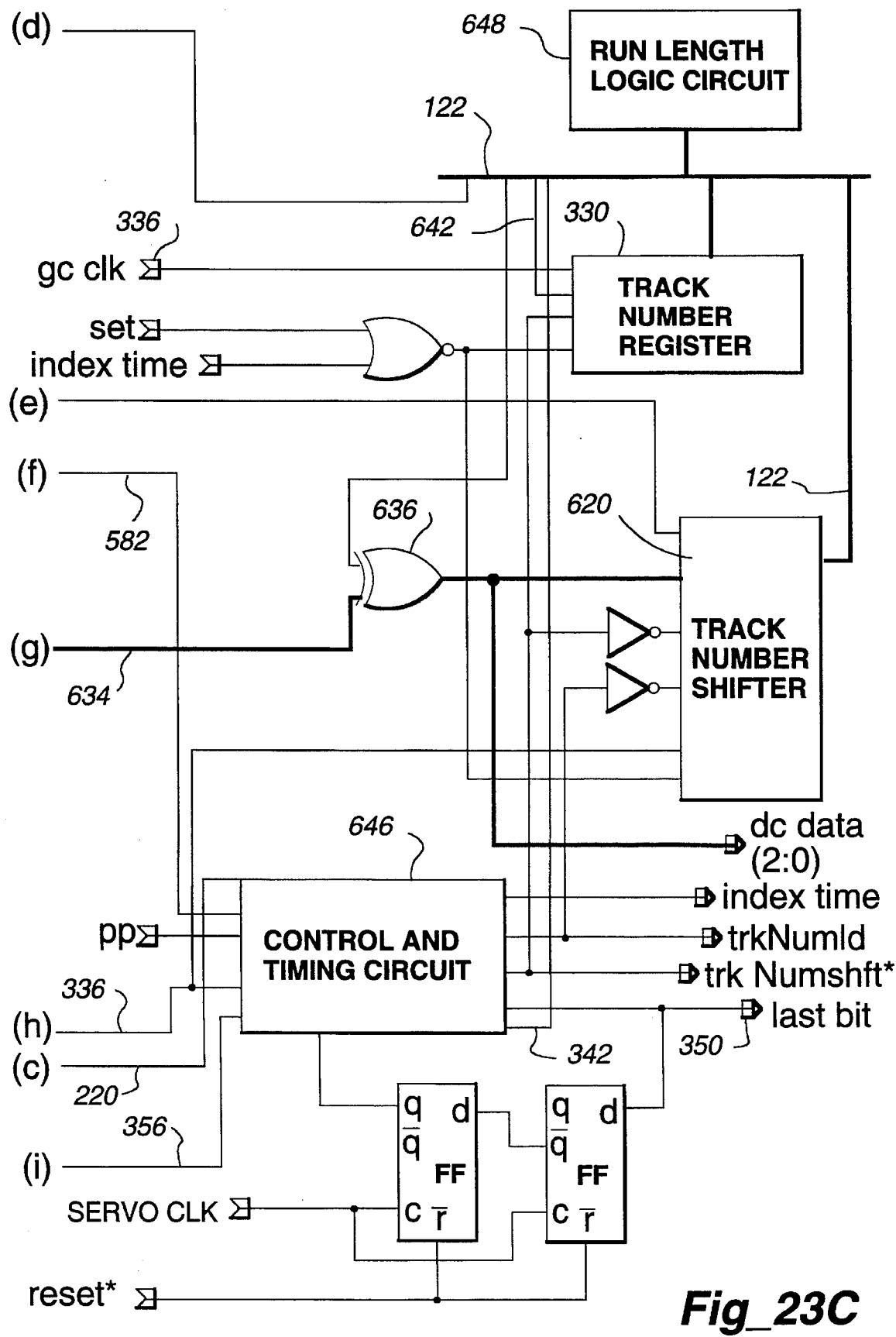
Fig_23C

SEQUENCE, TIMING AND SYNCHRONIZATION TECHNIQUE FOR SERVO SYSTEM CONTROLLER OF A COMPUTER DISK MASS STORAGE DEVICE

This invention relates to computer mass storage devices having rotating computer disks with servo field control information recorded on the disk, such as by imbedding it in a track on the disk. More particularly, the present invention relates to controlling the timing, sequence of operations and synchronization of a servo system controller associated with a rotating disk mass storage device, thereby enabling improvements in performance associated with reading data from and writing data to the disk. More particularly still, the present invention relates to an integrated circuit implementation of a new and improved servo system controller which allows selection of a plurality of different operational functions associated with controlling a rotating disk computer mass storage device.

CROSS-REFERENCE TO RELATED APPLICATIONS

The present invention is related to those described in U.S. patent applications Ser. No. 08/071,773 for INTEGRATED CIRCUIT AND METHOD FOR SERVO SYSTEM CONTROL IN A COMPUTER MASS STORAGE DEVICE, filed concurrently herewith; and Ser. No. 08/071,472 for BURST COMPARISON AND SEQUENTIAL TECHNIQUE FOR DETERMINING SERVO CONTROL IN A MASS STORAGE DISK DRIVE DEVICE, filed concurrently herewith. These related applications are assigned to the assignee hereof. These related applications are incorporated herein by this reference.

BACKGROUND OF THE INVENTION

In a rotating disk computer mass storage device, data and control information is typically recorded on concentric tracks on the disk. One type of arrangement imbeds the control information in servo fields. The servo fields are spaced periodically along the length of each track. The servo fields include information which describes the track number, the position on the track, synchronization information, and other information. Between each of the servo fields, data is recorded in a data field. Each servo field is utilized to identify the following data field and to position accurately a head or transducer which reads or writes the data field, among other functions. This type of arrangement is referred to as an imbedded servo field and control system because the servo field is imbedded in each of the tracks, rather than other arrangements which record the servo and control information on separate tracks from those which contain data.

Typically, the information contained in the servo fields is recorded by a precise laser/magnetic recording or other suitable device at the time of manufacture of the disk drive. By using the servo field information, the user may then write data into the data fields interspersed between the servo fields, or may access and read data previously recorded between the intervening servo fields.

Proper functionality of a rotating disk computer mass storage device requires that the disk be rotated at a substantially constant speed. Servo system controllers are employed to, among other functions, regulate the rotational speed of the disk. However, due to the practical response limits of a control system, it is sometimes very difficult or impossible to maintain a high degree of precision in controlling the rate of disk rotation. Furthermore, because the frequency at which information is recorded on each track is extremely high compared to the rotational speed of the disk, slight variations in disk rotational speed translate into significant variations in the signalling frequency for writing to or reading from each track. These signalling frequency variations present significant difficulties when attempting to synchronize the logic of the servo system controller to the asynchronous information received from the disk. Thus, despite very effective motor speed regulation control systems, it is virtually impossible to avoid signalling frequency variations.

The problems of controlling the rotational speed and synchronizing the reading of data from or writing data to rotating disk mass storage devices can be particularly difficult in portable computers. Portable computers are frequently used on unstable surfaces, and therefore are subject to being physically disturbed and moved. Each physical movement of the computer applies forces on the rotating disk, and those forces typically cause minor perturbations or variances in the speed of the disk.

Even in circumstances where physical movement of the computer does not translate into variations in disk rotational speed, other factors may intervene. For example, despite the normally reliable and consistent manner in which the servo field information is recorded on the tracks, occasionally there are variations in the frequency or periodicity at which the information is recorded. These variations may cause variations in timing and synchronization even though the computer disk is rotating at precisely the desired rate.

The information recorded on the tracks is in the form of a curvilinear series of dibits, or magnetic field reversals. The strength of the magnetic field reversals is very small, thereby presenting a situation where electrical noise may represent a significant component of the signals induced in a transducer or head of the disk drive. The presence of noise raises the risk that the noise may obscure or corrupt the recorded information. The noise may cause substantial difficulty in correctly detecting and responding to the servo information when controlling the operation of the disk drive. In some situations, noise may be the most or a highly significant detriment to the best operation of the servo system controller and the disk drive device.

SUMMARY OF THE INVENTION

The improvements of the present invention relate primarily to a servo system controller for a disk drive device which includes a rotating mass storage disk. The disk has a plurality of tracks with data field and servo field information recorded in the tracks. The disk drive includes a transducer or head to read information recorded in the servo and data fields, and a read/write channel for supplying servo data signals related to the servo data information read by the head.

In one respect, the improvements to the servo system controller include a timing error determining circuit responsive to the servo data signals derived from corresponding information in sequential servo fields. The timing error determining circuit determines variations in speed of movement of the track relative to the head between sequential servo fields, and supplies a timing error signal when the amount of variation is equal to or greater than a predetermined threshold value.

By use of a threshold value, the critical limit of rotational speed variation is readily recognized. Speed variations less than the threshold can be ignored. This timing error information makes it possible to determine the integrity and reliability of the data read or written during times when unexpected variations in the disk speed might occur. Any external forces and perturbations causing unexpected variations in disk rotational speed can be detected quickly. Reading and writing errors that would occur under such circumstances can be avoided until corrections in the rotational speed of the disk have been made. This is particularly useful for portable computers which may be subject to unexpected forces on the rotating disk resulting from movement. The timing error information may be used in addition to and not as a substitute for spindle motor control.

In another respect, the improved servo system controller includes a digital synchronizer which is responsive to the servo data signals which are delivered asynchronously but within an acceptable frequency range related to the normal frequency. The digital synchronizer establishes a regularly occurring cell clock signal occurring at the normal frequency, a cell during which only one servo data signal will occur (if it occurs at all) and during which at least one cell clock signal occurs, and a cell data signal which is related to the servo data signal and which occurs during the cell. The cell clock signal clocks logical operations associated with the cell data signal in the logic circuits associated with the servo system controller.

By use of the cell clock signal, all of the logic circuits of the servo system controller will be clocked in a synchronized manner relative to the potentially asynchronous servo data signals. The functionality of deriving the cell clock signals on a regularly occurring basis but within the window of each cell, reliably captures the information represented by the asynchronous servo data signals. The cell data signals are produced in a manner which is very error tolerant, thereby ensuring reliability in reproducing data signals from the variable and asynchronous environment of the rotating disk.

In still another respect, the improved servo system controller includes a concurrence determining circuit which responds to a predetermined series of cell data signals related to servo data signals derived from information within the servo field. The concurrence determining circuit determines the degree of concurrence between the predetermined series of cell data signals and an actual pattern of signals corresponding to the same information within the servo field, and supplies a threshold met signal when the degree of concurrence is equal to or greater than a predetermined threshold concurrence value less than complete concurrence.

The concurrence determining circuit offers the capability to selectively relax the requirement of strict concurrence between the servo data signals read from the portions of the servo field, such as a servo address mark ("SAM") and a servo synchronization mark ("SSM"), and the precise pattern of signals indicating the SAM and the SSM. As a consequence, should minor errors in writing or reading the SAM or the SSM in the servo field occur, or should noise corrupt some of the signals read, for example, it is still possible to read and write data in the data field following the servo field in which the errors occurred. This improvement allows the normal operation of reading and writing data even though slight inconsistencies may be detected in the SAM and SSM fields, thus improving data throughput while still achieving an adequate level of error tolerance.

An additional aspect of the improved servo system controller relates to a transition pattern decoder and an index mark detector. The transition pattern decoder is responsive to the cell data signals derived from a track number code of the servo field information. The transition pattern decoder responds to these signals and determines a Gray code data signal from the cell data signals corresponding to the information relating to the track number. The transition pattern decoder is selectively programmable to respond to a selected one of a plurality of different Gray codes, to allow the user an opportunity to select among a number of different Gray codes which will be decoded. An index mark detector is responsive to the cell data signals derived from an index mark in the servo field information. The index mark detector responds to these signals to recognize the index mark in each track.

Numerous other significant improvements are available from the present invention. A more complete appreciation of the present invention and its scope can be obtained from understanding the accompanying drawings, which are briefly summarized below, the following detailed description of a presently preferred embodiment of the invention, and the appended claims.

BRIEF DESCRIPTION OF THE DRAWINGS

FIG. 2 is an illustration of a disk of the head disk assembly shown in FIG. 1 illustrating recording tracks on the disk.

FIG. 3 is an illustration of servo and data fields within each recording track of the disk shown in FIG. 2.

FIG. 4 is an illustration of exemplary fields within one servo field shown in FIG. 3.

FIG. 5 is an expanded block diagram of the major components of the servo system controller shown in FIG. 1.

FIG. 6 is a block diagram of a servo microsequencer ("SMS"), a servo decoder and other components shown in FIG. 5.

FIG. 7 is an expanded block diagram of the SMS shown in FIG. 6.

FIG. 8 is an illustration of the timing achieved by the SMS shown in FIG. 7 relative to the servo and data fields shown in FIG. 4.

FIG. 9 is a circuit and logic diagram of a timing error logic circuit of the SMS shown in FIG. 7.

FIG. 10 is an expanded block diagram of the servo decoder shown in FIG. 6.

FIGS. 11A and 11B collectively form a circuit, block and logic diagram of a portion of a digital PLL synchronizer of the servo decoder shown in FIG. 10.

FIGS. 12A, 12B, 12C, 12D, 12E, 12F and 12G are timing illustrations of exemplary signals of the digital PLL synchronizer shown in FIGS. 11A and 11B, operating in a resynchronization mode of operation.

FIGS. 13A, 13B, 13C, 13D, 13E and 13F are timing illustrations of exemplary signals of the digital PLL synchronizer shown in FIGS. 11A and 11B, operating in a free running mode of operation.

FIG. 14 is logic diagram of a circuit for deriving count values to be used by a decrementer counter of the digital PLL synchronizer shown in FIGS. 11A and 11B.

FIG. 15 is a logic circuit diagram of a servo data synchronizer of the digital PLL synchronizer shown in FIGS. 11A and 11B.

FIG. 16 is a generalized functional block diagram of a majority voter circuit used in a SAM/SSM detection circuit of the servo decoder shown in FIG. 10.

FIG. 17 is a logic circuit and block diagram of the majority voter circuit shown in FIG. 16.

FIG. 18 is a logic circuit diagram of a tally circuit employed in the majority voter circuit shown in FIG. 17.

FIG. 19 is a simplified state diagram of the functional states of servo decoder shown in FIG. 10, representing the functionality of the majority voter circuit shown in FIG. 16.

FIGS. 20, 21 and 22 are charts showing the transition patterns, codes and track numbers of a dibit, pulse position code three and pulse position code two, respectively, of different Gray codes recognized by the servo decoder shown in FIG. 10.

FIGS. 23A, 23B and 23C collectively form a logic circuit and block diagram of components of a transition pattern decoder, a track number decoder, an index logic circuit, an external data circuit, and a track number register of the servo decoder shown in FIG. 10.

DETAILED DESCRIPTION

Figure 1:
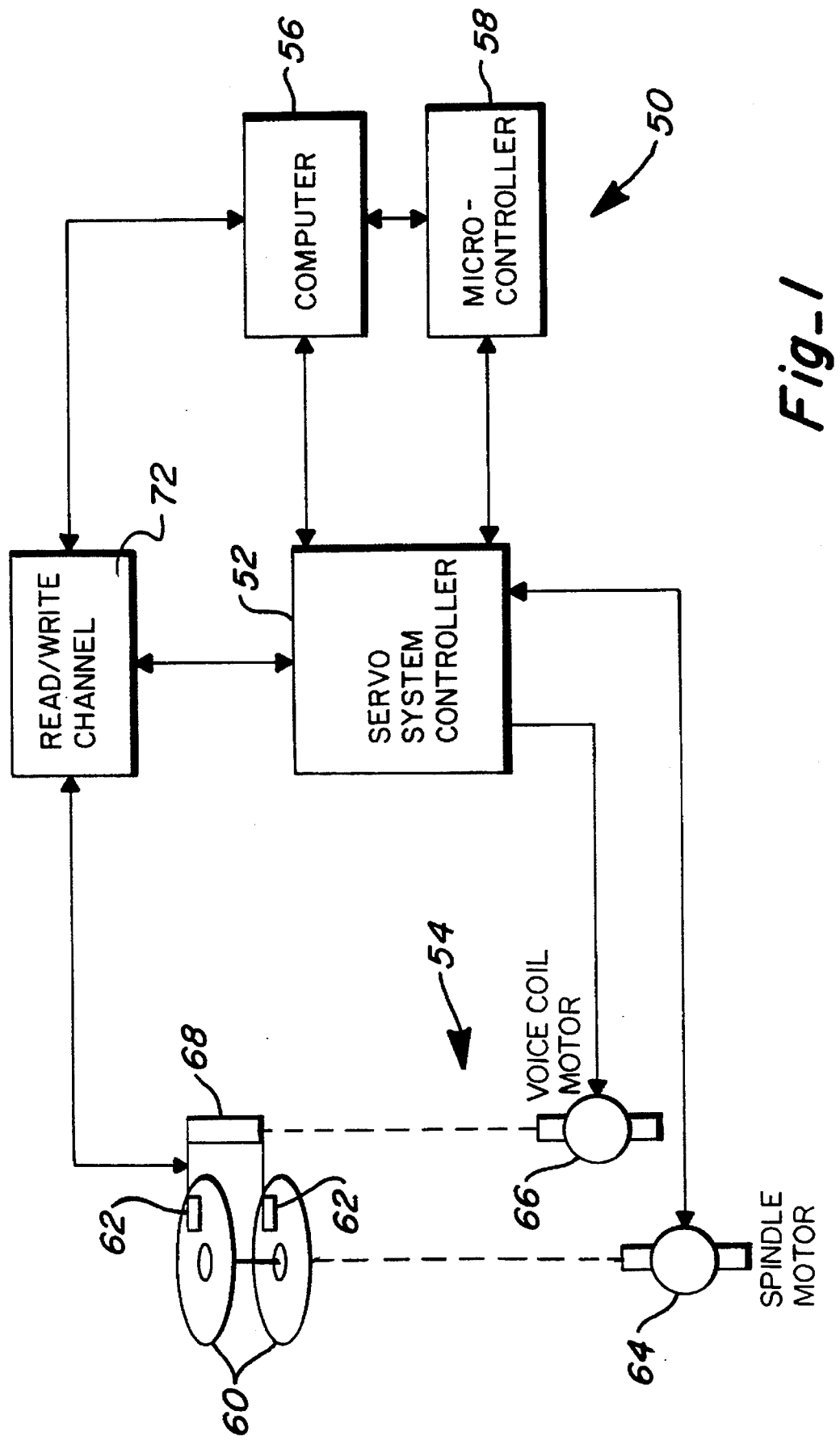
FIG. 1 is a generalized block diagram of a typical rotating disk drive computer mass storage device, including a head disk assembly, a servo system controller, a read/write channel and a connected computer or micro-controller.

A rotating disk drive computer mass storage device 50 incorporating the present invention is shown in FIG. 1. The disk drive device 50 includes a servo system controller 52 which operates in conjunction with a head disk assembly ("HDA") 54. Depending on the architecture of the computer system in which the disk drive device 50 is employed, ultimate control over the device 50 is either from a computer 56, or is from a microcontroller 58 which is in turn controlled by the computer 56. A significant portion of the present invention relates to a servo micro-sequencer and servo decoder, which are incorporated in the servo system controller 52, both of which are discussed in detail below.

The HDA 54 comprises one or more conventional magnetic disks 60 upon which data may be written to, or read from, by means of a series of magnetic transitions, reversals or dibits recorded on a hard magnetic surface of each disk 60. The magnetic reversals are written (recorded) and read by transducers or read/write heads 62. A spindle motor 64 rotates the disks 60 with respect to the heads 62 while a voice coil motor ("VCM") 66 moves an actuator 68 to position the heads 62 on the disks 60 for reading information from or writing information to the disks 60.

The magnetic reversals are recorded on the disks 60 in curvilinear concentric patterns known as tracks 70, as shown in FIG. 2. The concentric tracks 70 extend from an inner diameter ("ID") 73 to an outer diameter ("OD") 74 of the recording surface on the disk. The actuator 68 and VCM 66 (FIG. 1) accurately position the heads 62 (FIG. 1) over the tracks 70. Without adequate positioning, it is impossible to achieve reliability in reading data from or writing data to the disk.

The information written to the tracks 70 on the disks 60 and the information read from the tracks 70 on the disks is directly communicated between heads 62 and a conventional read/write channel 72 shown in FIG. 1. During a write operation, the read/write channel 72 receives digital signals from the computer 56, conditions the signals and supplies them to the heads 62. During a read operation, the read/write channel 72 receives signals from the heads, conditions them and sends them to the computer 56. During both the read and write operations, the read/write channel 72 receives signals from the tracks on the disks and applies these signals to the servo system controller 52 to control aspects of operation of the HDA 54 and the device 50.

The repeating number of servo fields 76 and data fields 78 in each track 70 in imbedded servo data disks is shown in FIG. 3. The servo field 76 is physically associated with the immediately following data field 78, as determined by the direction of rotation of the disk 60 relative to the head 62. A plurality of servo fields, for example fifty, and an associated corresponding number of data fields are recorded on each track 70. The number of tracks on each disk is usually relatively high, for example over two thousand.

Each servo field 76 is formed by a number of specific subpart fields as shown in FIG. 4. The servo field 76 typically includes a preamble 80, a servo address mark ("SAM") 82 which may comprise one or two servo address fields ("SAF"), a servo synchronization mark ("SSM") 84, an index 86, a track number code 88 and a number of off-track bursts 90, typically four. The order in which these fields of the servo field 76 occur is sometimes changed. The preamble 80 is a series of magnetic transitions which represents the start of the servo field 76. One or two contiguous SAFs in a SAM 82 are used to signal the beginning of available information from the servo field 76. The SSM 84 is a unique pattern that is detected as a timing, control and synchronization reference point within each servo field 76. A code or mark is present in only one of the index fields 86 of all of the servo fields appearing in each track 70. The index mark is a reference used to count the number of servo fields in each track 70 when the disk 60 is rotating. In general, all index marks are aligned on a radial reference on the disk. The track number code 88 is used for uniquely identifying each track 70. Usually a Gray code is used to record the pattern of magnetic reversals which make up the track number code 88. The off-track bursts 90 are employed to control the fine positioning of the head 62 relative to the tracks 70. In general the fields 80–90 which form the servo field 76 contain control information used by the servo system controller 52 to achieve proper operation of the HDA 54 and the disk drive device 50.

The spindle motor 64 rotates the disks 60 in response to control signals supplied by the servo system controller 52 as shown in FIG. 1. The controller 52 regulates the rotational speed of the spindle motor 64 to maintain the rotational speed of the disk as close as possible to a fixed constant rate, for example 6,000 rpm. A voice coil motor ("VCM") 66 is operatively controlled by the controller 52 to move the heads 62 to desired tracks 70 and to maintain the heads in position to read and to write information on the tracks 70.

The signals supplied to and received from the HDA 54 approximate analog signals and the functionality of the controller 52 is typically digital. Consequentially the controller 52 includes appropriate analog to digital converters (ADCs) and digital to analog converters (DACs) to accomplish signal conversions.

More details of the servo system controller 52 are shown in FIG. 5. All or a substantial majority of the servo system controller 52 may be advantageously incorporated in a single integrated circuit. The servo system controller 52 comprises a servo control subsystem 102, an analog-to-digital ("A/D") subsystem 104, a digital signal processor ("DSP") subsystem 106, an digital-to-analog ("D/A") subsystem 108, a spindle control subsystem 110, an interface circuit 112, a parallel/serial ("P/S") input/output ("I/O") port 114, a sector mark generator 116, and a general purpose timer and clock 118, all of which are all operatively connected to an internal bus 122 as shown.

The servo control subsystem 102 further comprises a servo decoder 124 and a servo microsequencer ("SMS") 126, which are connected together. Both the servo decoder 124 and SMS 126 are connected to the internal bus 122. The servo decoder 124 receives signals from the SMS 126 as well as signals 128 from the read/write channel 72 (FIG. 1). The servo decoder 124 and the SMS 126 are essentially responsible for timing, control, synchronization and decoding of servo information from the servo fields 76 of the tracks 70.

The servo decoder 124 is a programmable logic circuit that offers improvements in synchronizing to the asynchronous receipt and logical processing of the servo field control signals 128 received from the rotating disk 60. Synchronization occurs quickly based on signals received from the head 62 even under the influence of noise and perturbations in the rotational rate of disk 60. Complete dependence on the spindle control subsystem 110 for establishing exact synchronization is avoided. When the intervals between individual magnetic reversals on the tracks 70 are not uniform but fall within acceptable limits for variations in signalling frequencies, synchronization is also maintained. The effects of noise, up to a user selected threshold, may also be overcome to achieve continued operation.

The servo decoder 124 uses a majority voter circuit to detect the SAM 82 and SSM 84 in a user-defined, less-than-identical manner. By validly detecting the SAM 82 and SSM 84 when the servo data signals supplied from the read/write channel 72 are not exactly the same as the expected patterns for the SAM 82 and the SSM 84, greater data handling efficiency and throughput are achieved. A level of noise immunity is also obtained, since minor adverse influences of noise are thereby avoided. Read and write operations are permitted under circumstances which would otherwise prevent them from occurring if strict concurrence of the SAM 82 and SSM 84 patterns was required. Higher throughput is obtained while preserving an adequate degree of functional error tolerance. In addition, the servo decoder 124 advantageously decodes a selected one of a number of user selected Gray code patterns to establish the track number, and also recognizes the mark in the index field 86.

The SMS 126 is a programmable logic circuit that offers improvements in better determining the synchronization of the occurrence of the servo fields 76 from the rotating disk 60. As is discussed in greater detail below, the timing between servo fields 76 is detected and a timing error is established. The amount of the timing error is evaluated to determine whether the degree of rotational speed error of the disk 60 merits signalling the microcontroller 58 or computer 56 of a significant error.

The SMS 126 controls the A/D subsystem 104 and certain portions of the P/S I/O port 114 for external event control. The SMS 126 may be used to interrupt the DSP subsystem 106 on timing events. The SMS controls the start of operations for the sector pulse generator 116. The SMS 126 also controls the servo decoder 124 to start searching for a servo field 76.

The A/D subsystem 104 comprises a multiplexer ("MUX") and ADC device 134, an A/D sequencer 136 (designated A/D SEQ in FIG. 5) and a burst magnitude comparator 138. The MUX and ADC device 134 and the A/D sequencer 136 are operatively controlled by the SMS 126. A number of read channel input lines 140 from the read/write channel 72 are applied to the MUX and A/D device 134. Output signals of the MUX and A/D device 134 are supplied as input signals to the A/D sequencer 136, which has its output signals applied as input signals to the burst magnitude comparator 138 as well as to the internal bus 122.

The A/D sequencer 136 accepts signals over the bus 122 from either the DSP subsystem 106 or the SMS 126 to control the A/D conversions of the ADC portion of the device 134. Preferably the SMS 126 has priority in the control of the A/D sequencer 136. The SMS may queue conversion requests to the A/D sequencer 136. Once the requests have been queued, control is turned over to the DSP subsystem 106. Queuing the conversions through the SMS 126 to the A/D sequencer 136 saves code space in the DSP subsystem 106 and ensures that the conversions will be quickly accomplished, since the A/D sequencer 136 automatically accepts the queued requests and sequences through the conversions without intervention. In this manner, conversion delay and therefore, transport delay, are minimized.

The burst magnitude comparator 138 contains circuitry that continuously processes four quadrature data signals 140 obtained from the off-track bursts 90 of the servo field 76. The burst magnitude comparator 138 responds to the burst signals to quickly obtain control information for positioning the heads 62 on the track 70. The functionality of the burst magnitude comparator 138 also eliminates a number of lines of firmware code and provides enhanced system performance by eliminating many microseconds of transport delay. In certain user-defined applications, the functionality of the burst magnitude comparator 138 is selectively bypassable.

The DSP subsystem 106 comprises a motion control engine or digital signal processor ("DSP") 142 and an associated data RAM ("D RAM") 144 and an instruction RAM ("I RAM") 146. The DSP 142 includes separate data and program paths for doing bit arithmetic with Boolean control functions, to thereby control some of the operations of the controller 52. The DSP 142 is coupled to the internal bus 122 and receives a timing signal input from the general purpose timer and clock 118. The DSP 142 is also connected to the spindle motor control subsystem 110. An external address bus 150 allows external monitoring of information in the I RAM 146.

The D/A subsystem 108 includes a VCM DAC 152, a spin DAC 154 and a park DAC 156 connected to the internal bus 122. The VCM DAC 152 provides an analog output signal to a VCM pre-driver 158. In a like manner, the spin DAC 154 provides an analog output signal to a spin pre-driver 160, and the park DAC 156 provides an analog output signal to a park pre-driver 162. The output signals of the pre-drivers 158 and 162 control the VCM 66 to move the actuator 68 to keep the heads 62 on the tracks, to move the heads between tracks, and to move the actuator to park the heads 62. The output signals from the pre-driver 160 controls the spindle motor 64 to control the rotational speed of the disk 60.

The spindle control subsystem 110 comprises an undervoltage detection circuit 164 which is connected to the internal bus 122. In an under voltage situation, usually indicative of power failure, it is important to park the head 62 in a location where data is not located, such as the disk 60 ID, to avoid data loss. The algorithm for achieving this functionality is coded into the I RAM 146 of the DSP subsystem 106.

The spindle control subsystem 110 also includes a spindle motor control circuit 166 connected to the internal bus 122 and controlled by DSP subsystem 106. The spindle motor control circuit 166 provides output signals to spindle motor pre-drivers 168 which supply spindle control signals to the spindle motor on lines 170. Back electromotive force ("EMF") is sensed at the spindle motor drive lines 170 and is provided as a feedback input signal at 171 to the spindle motor control circuit 166 for control purposes.

In an alternative embodiment of servo system controller 52, portions of the D/A subsystem 108 and the spindle control subsystem 110 may be combined, thereby obviating the spin DAC 154 and the spin pre-driver 160.

The general purpose timer and clock 118 is connected to the internal bus 122 and supplies a system-wide servo clock signal by which to derive all of the timing functions of the servo system controller 52, as described below.

The interface circuit 112 is connected to the bus 122 for communicating between the servo system controller 52 and the microcontroller 58 and/or computer 56 (FIG. 1) by means of an interface bus 172. The interface 112 contains registers by which information is recorded and exchanged. The interface bus 172 provides an I/O mapped interface to the D RAM 144. By means of the interface bus 172, the D RAM 144 may be directly written by the external microcontroller 58 and/or computer 56.

The P/S I/O port 114 is also connected to the bus 122. Serial I/O signals to and from the port 114 are communicated over serial I/O lines 174. The serial I/O lines 174 are used for general communication with the computer 56 (FIG. 1) and may comprise lines dedicated for frame information, for bidirectional data transfer and for clock signals. The serial portion of the port 114 is automatically configured for reception of data except when a transmission occurs. A parallel bus 176 of the port 114 is controlled by the SMS 126 and the DSP 142, with each device controlling a portion of the bus terminals. The port 114 also contains registers which allow information to be recorded and exchanged with the servo system controller 52.

The sector mark generator 116 is controlled by the SMS 126 and is also connected to the bus 122. The sector mark generator 116 provides a control signal on a line 178 when a data field is present in zone or "banded" recorded disks 60, since a servo field 76 may bisect a data field 78 in an adjacent track in an asymmetric fashion in banded or zoned disks, as is known. The sector mark generator 116 is more fully described in U.S. patent application Ser. No. 07/904,804 filed Jun. 25, 1992, entitled DYNAMIC CONTROL OF DISK SECTORS and assigned to the assignee of the present invention.

Servo Control Subsystem

The improvements of the present invention relate primarily to the servo control subsystem 102. The functional relationship between the servo decoder 124 and the SMS 126 in the servo control subsystem 102 is better shown in FIG. 6.

The SMS 126 comprises a SMS sequencing logic circuit 200 and a SMS I RAM 202. The data in the I RAM 202 constitutes instructions which the sequencing logic circuit 200 uses to control operation of the subsystem 102. The data is recorded in the I RAM 202 by signals applied over the bus 122, either by the DSP subsystem 106, the computer 56 or by the microcontroller 58. The sequencing logic circuit 200 sends signals 204 to a register 206 of the P/S I/O port 114.

In general, the means for external control of the servo decoder 124 and the SMS 126 and its sequencing logic circuit 200 is through signals applied from a register 210 of the interface circuit 112.

Operation of the SMS 126 commences in response to a start SMS signal applied at 212 from the register 210. The SMS sequencing logic circuit 200 supplies address signals at 214 to the SMS I RAM 202 and receives SMS instruction signals at 216 which correspond to the information recorded in the I RAM 202 at the location addressed by the signals 214. In response to the instruction signals 216, the SMS sequencing logic circuit 200 enables the servo decoder 124 to begin searching for the fields 80–90 within the servo field 76, by sending an enable SSM search signal at 218 to the servo decoder 124. The servo decoder 124 responds by evaluating information 128 supplied by the read/write channel 72. When the servo decoder 124 finds the SSM 84, the servo decoder returns a SSM found signal at 220 to the SMS sequencing logic circuit 200. In response to the SSM found signal 220, the servo microsequencer 126 functions as a timing engine for generating time windows in which the servo decoder 124 detects the track number code, index mark, and the off-track bursts of the servo field 76.

The SMS 126 controls the read/write channel 72 by means of the signal 204 applied to the register 206. In addition, the SMS 126 may be programmed to control the automatic gain control ("AGC") of the read/write channel 72 and the acquisition of signals from the off-track bursts 90. The SMS 126 may also be programmed to control the A/D subsystem 104 in a sequential burst mode. The operational parameters or configuration of the servo decoder 124 is established and controlled by information or signals supplied on the internal bus 122.

Timing Error Information for Reading Servo Fields

One of the improvements available from the present invention relates to the ability to establish error information regarding timing events associated with the presence of the servo fields 76 imbedded in the tracks 70 of the rotating disk. This improvement is particularly important because of the possibility of external forces and perturbations causing unexpected variations in disk rotational speed. This improvement is particularly useful for portable computers which may be subject to unexpected influences on disk rotation resulting from movement. The timing control information provided by the SMS 126 and servo decoder 124 may be used in addition to and not as a substitute for spindle motor control. Primarily, the timing information supplied by the SMS 126 and the servo decoder 124 is useful for determining the integrity and reliability of the data read or written during times when unexpected variations in the disk speed might occur.

A more complete understanding of the SMS 126 in achieving these improvements is apparent from the block diagram of the SMS shown in FIG. 7. The SMS 126 is a timing control sequencer engine operating from instructions recorded in the I RAM 202. The instructions recorded in the I RAM 202 are loaded from the microcontroller 58 or computer 56 (FIG. 1) over the bus 122. A controllable switch 222 establishes a connection between the bus 122 and the I RAM 202 to allow the instructions to be recorded. Typically, the instructions from the microcontroller 58 will be recorded in the I RAM 202 during initialization at the start of operations. During use of the SMS 126, the microcontroller 58 or computer 56 may also access and read instructions within the I RAM 202 provided that the switch 222 is closed, thereby connecting the bus 122 to the I RAM 202. A MUX 224 is also connected to the bus 122. Under conditions where the switch 222 is closed, the MUX 224 supplies address signals to the I RAM 202 from the bus 124. Under conditions where the switch 222 is open, the SMS 126 operates from instructions in the I RAM 202. This type of operation allows the microcontroller 58 or the computer 56 to modify the instructions in the I RAM when desired or necessary to achieve control functions, even under some conditions where the SMS 126 is in the process of evaluating a servo field 76.

During operation of the SMS 126, a program counter 226 supplies signals 214 to address each instruction in the I RAM 202. The program counter 226 supplies the I RAM address instructions 214 to the MUX 224. With each I RAM address signal 214 supplied by the program counter 226 through the MUX 224, the I RAM 202 responds by supplying an instruction signal 216. An instruction decoder 230 receives the instruction signals 216 and decodes them to control operation of the SMS 126. Signals decoded from the instruction decoder 230 are applied to the program counter 226 to cause the program counter 226 to index in a controlled manner.

Some of the instructions 216 supplied from the I RAM 202 are applied to a delay counter 232. The instructions applied to the delay counter 232 are interpreted as count values corresponding to predetermined times. The delay counter 232 counts in response to the count values supplied by the I RAM 202. These count values achieve first, second and third countdown time periods used for detecting the fields within the servo field 76 as described below, as well as other time delays.

The principle involved in detecting errors in servo field timing is illustrated generally in FIG. 8. Two sequential servo fields 76A and 76B are shown as spaced along and imbedded within the track 70. At normal disk rotational speeds, the time distance between the two servo fields 76A and 76B should be consistent with the time distance between all other sequential servo fields 76. At the end of each servo field, the delay counter 232 (FIG. 7) is started and it counts during the time period of the data field 78 between the adjacent sequential servo fields 76A and 76B. The counted time period during the movement of the head 62 over the data field 78 is referred to as the first countdown time period 234. At normal disk rotational rates, the time distance between the two sequential servo fields 76A and 76B will be the same amount of time to which the delay 232 counter will be set during the first countdown time period 234. Thus, under normal operating conditions, the delay counter 232 will count down to a count of zero at the beginning of the next sequential servo field 76B.

At the end of the first countdown period 234, a second countdown period 236 will be initiated in the delay counter 232. The second countdown period 236 is a time period, set with respect to normal disk rotational conditions, at the end of which it is expected that the SSM 84 will be detected within the servo field 76. Under normal rotational conditions, the second countdown period 236 will be zero at the time that the SSM 84 is detected. However, if there has been a variation in the normal disk rotational speed, the SSM 84 will be detected either before or after the second countdown time period 236 reaches zero. The amount by which the second countdown 236 departs from zero when the SSM 84 is detected, either plus or minus, will represent the extent of variation in the disk rotational speed compared to the normal condition. This is referred to as the timing error, and the amount of timing error is represented at 238 because the second countdown 236 did not reach zero. The value 238 at the time when the SSM is detected is therefore directly related to the unexpected variation in disk rotational speed.

After the SSM 84 in the servo field 76B has been detected, a third countdown time period 240 is started in the delay counter 232. The delay counter 232 normally reaches a zero count at the end of the third countdown time period 240, at the end of the servo field 76. Of course, at the end of the servo field 76B, the described process is repeated by establishing another first countdown time period 234, another second countdown time period 236, another timing error count 238 and another third countdown time period 240.

Although three countdown time periods 232, 234 and 236 are used, it is possible to achieve the same effect with only a single countdown time period operative between subsequent SSMs 84. The use of the three countdown time periods is preferred, however, to achieve time relationships relating to the data field 78 as reflected by the first countdown time period 234, to the detection of the index mark 86, the track number code 88 and the off-track bursts 90 during the third time period 240, and the detection of the preamble field 80 and SAM field 82 during the second countdown period 234. These three countdown periods and further subdivisions of these time periods allow an opportunity for specific control and adjustments achieved by the SMS 126, the DSP 142, the computer 56 or the microcontroller 58 during operation of the servo system controller 52.

Referring back to FIG. 7, upon counting to zero, the delay counter 232 supplies a signal at 242 to the program counter 226. The signal 242, in conjunction with the other input signals to the program counter 226, change the I RAM address signal 214 supplied through the MUX 224 to the I RAM 202. As a result, the instruction signal 216 supplied to the instruction decoder 230 changes, causing a charge in functionality of SMS 126 to occur based on each new instruction.

In addition to the signal 242, the delay counter 232 also supplies an access signal 244 to an AND gate 246. A signal 248 from the bus 122 is also supplied to the AND gate 246 by the DSP 142, the computer 56 or microcontroller 58. The signal 248 represents a request by the DSP 142, microcontroller 58 or computer 56 to access the I RAM 202. The signal 244 from the delay counter 232 to the AND gate 246 is supplied until a time, for example at least two counts, prior to a changed instruction signal being supplied at 216. The count at which the signal 244 is terminated is determined to allow the DSP 142, microcontroller 58 or computer 56 adequate time to access the I RAM 202 before the signal at 242 causes a critical change in the instruction signal 216 supplied by the I RAM 202. When the delay counter 232 counts to the limit at which signal 244 is terminated, the AND gate 246 changes states and supplies a signal at 250 to the switch 222. The switch 222 opens and prevents access to the I RAM 202 from the bus 122. The signal 250 is also applied to the MUX 224 to prevent any information from the bus 122 to be written to the I RAM 202.

A timing error logic circuit 260, shown in FIG. 7, determines the amount of the timing error 238 (FIG. 8). The timing error logic circuit 260 receives a signal 262 from the instruction decoder 230 at the beginning of the first countdown time period 234 (FIG. 8). In response to the signal at 262, the timing error logic circuit 260 starts its own internal counter. When the SSM 84 is found by the servo decoder 124, the SSM found signal 220 is supplied. The SSM found signal 220 terminates the count of the timing error logic circuit 260, thereby providing a count value which represents the amount of the timing error 238. The SSM found signal 220 is also supplied to the instruction decoder 230 which responds by supplying control signals to reset the program counter 226 at the start of the sequence of instructions supplied by the I RAM 202.

After the amount of the timing error has been determined by the timing error logic circuit 260, the absolute value of that timing error is compared to a threshold. The threshold value is established by the user. If the timing error value exceeds the threshold value, an interrupt signal is generated and applied to bus 122. The interrupt signal is recognized by the microcontroller 56 or computer 58 as an indication that data read from or written in the previous data field 78 may be unreliable due to the fact that a permissible margin of timing error was exceeded between the occurrence of the preceding and following SSMs 84. The type of action taken by the microcontroller 56 or computer 58 in response to the interrupt is established by the user in the firmware or software.

If the comparison between the timing error value and the threshold value indicates that the timing error does not exceed the threshold, no interrupt signal is supplied, and normal operation is allowed to continue.

Exemplary instructions supplied by the I RAM 202 and their addresses to achieve the delays necessary to determine the countdown time periods 234, 236 and 240, and to determine the timing error 238 relative to the detection of sequential SSMs, are shown in the chart below:

| ADR | Instruction Description |
| --- | --- |
| 0. | Delay for third countdown |
| 1. | Reset enable SSM Search |
| 2. | Set AGC |
| 5. | Convert Burst A |
| 13. | Convert Burst B |
| 18. | Convert Burst C |
| 23. | Convert Burst D |
| 24. | Enable Servo Read |
| 25. | Delay for first countdown |
| 30. | Delay for second countdown |
| 36. | Start timing error counter |
| 40. | Enable SSM search |
| 43. | Branch to zero |

As can be seen from the foregoing exemplary instructions, the detection of the SSM 84 causes the instruction decoder 230 to force the program counter 226 to the zero address instruction. After being forced to the zero address instruction, a delay for the third countdown time period 240 is established. A delay instruction is sent to the delay counter 232, and the delay counter 232 counts until that delay is accomplished, and then signals the program counter 226 to move to the next instruction. Thereafter, the SSM search is reset to allow another SSM 84 to subsequently be detected. The AGC of the read/write channel 72 is set. The four off-track bursts 90 from the servo field 76 are thereafter sampled and converted. The read/write channel 72 is then enabled, and the delay for the first countdown time period 234 is then established. The data from the data field 78 may then be read. At the end of the first countdown time period, the delay for the second countdown time period 236 is established, and the search for the SSM 84 begins. Upon detection of the SSM 84, a branch to the zero address instruction occurs. This sequence then repeats itself. If the SSM 84 is missed or not found, the second countdown time period will progress to a point where the timing error exceeds the threshold value, and the interrupt will be generated to signify an error.

A loop counter 268 of the SMS 126 also receives the instructions 216, as shown in FIG. 7. The function of the loop counter 268 is to respond to the instructions 216 to selectively establish a loop for repeating the instructions applied from the I RAM 202. It is by this functionality that the instructions are maintained while the time delays of the delay counter 232 are achieved.

In response to the applied instructions, the instruction decoder 230 also supplies signals 270, 272, 274 and 276. As is also shown in FIG. 5, the signal 270 controls the MUX and ADC device 134. The signal 272 enables the A/D sequencer 136 to start the conversion of information in the servo field 76. The signal 274 enables the servo decoder 124 to commence searching for the SSM 84. The last signal 276 constitutes an interrupt which is supplied to the P/S I/O port 114.

Timing Error Logic Circuit

A more specific appreciation for the manner in which the timing error logic circuit 260 determines the value of the timing error (238, FIG. 8) can be obtained by reference to FIG. 9. The functionality of the timing error logic circuit 260 is controlled by servo clock signals 280 supplied from the timer and clock 118 (FIG. 5). The servo clock signals 280 are supplied for use in directly clocking the logic circuit elements of the servo system controller 52 or for use in deriving other signals for clocking the logic circuit elements of the controller 52.

Two of the signals 262 supplied by the instruction decoder 230 (FIG. 7) are an enable signal 281 and a counter control signal 282. The signals 281 and 282 are applied to the input terminals of an AND gate 283. An output signal from the AND gate 283 is applied to set an enable flip flop 284. An output signal from the enable flip flop 284 enables a loadable decrementer counter 285. Another one of the signals 262 supplied from the instruction decoder 230 (FIG. 7) is a signal 286 which establishes the starting value of the count loaded into the counter 285. The servo clock signals 280 thereafter cause the counter 285 to start counting from the loaded value toward zero. The value loaded by the signals 286 into the counter 285 represents the amount of time for the second countdown time period 236 (FIG. 8) at normal disk rotation speeds.

At the point where the SSM is found, the SSM found (SSM FND) signal 220 sets a reset flip flop 287. An output signal 288 from the reset flip flop 287 resets the enable flip flop 284, terminating enablement of the counter 285. The counter 285 thus stops counting at the count value 238 when the SSM is found. The ending count value represents the absolute value of the amount of timing error 238. If the SSM is earlier than expected, the counter 285 will not have reached zero, and the remaining count value will represent the negative timing error. If the SSM is late, the counter 285 will have counted past zero to a value which represents the positive timing error. In either case, the signal 238 represents the absolute value of the timing error relative to the actual arrival time of the SSM compared to its anticipated arrival time.

The absolute value timing error 238 from the counter 285 is applied to a latch 290. The latch 290 will hold the timing error value 238 and allow it to be read from the bus 122. The timing error value is therefore available to the DSP 142, microcontroller 58 or the computer 56, and is used by the DSP 42, microcontroller 58 or the computer 56 to make determinations under firmware control as to the actions to be taken.

The DSP, microcontroller or computer will not be signalled by an interrupt unless the timing error value 238 exceeds a threshold value represented by a signal at 292. The threshold value 292 is supplied from a threshold register 294. The threshold value 292 is loaded into the threshold register 294 by the microcontroller 58 or computer 56 from the bus 122. The threshold value 292 is applied to one input terminal of a comparator 296. The other input signal to the comparator is the timing error value 238.

The comparator 296 determines whether the timing error value 238 exceeds the threshold value 292. If it does, an output signal 297 is supplied to a flip flop 298. The flip flop 298 is set in response to the signal 297, and the output signal from the flip flop 298 is supplied as an interrupt signal 300 to the bus 122. The interrupt signal 300 will be read by the DSP 142, the microcontroller 58 or computer 56. In response to the interrupt signal 300, the DSP, microcomputer or computer will read the value in the latch 290 to determine the extent of the timing error, and take the actions programmed by the user.

Not shown in FIG. 9 are the conventional logic elements necessary to reset all of the components after detection of each SSM 84, to thereby enable the elements to again function in the manner described to determine the timing error upon detection of the next SSM 84. Such reset circuitry, as well as the necessary logic circuitry to achieve the delays necessary to accommodate the propagation and other inherent practical aspects of signal conductivity through logic gates, may be achieved or accommodated by conventional techniques.

Servo Decoder

General details concerning the servo decoder 124 and its interaction with the SMS 126 are shown in FIG. 10.

A digital phase locked loop ("PLL") synchronizer 312 is employed to detect and synchronize the logic of the servo system controller 52 to the presence of asynchronously occurring servo data pulses 310. The servo data pulses 310 are supplied by the read/write channel 72 in response to the presence of magnetic reversals or dibits on the tracks 70 of the rotating disk 60. The digital PLL synchronizer 312 receives the servo data pulse signals 310 and the servo clock signals 280, and in response, creates a synchronous cell clock signal 314 and a cell data signal 316. By use of the cell clock signal 314, all of the logic circuits will be clocked in a regular synchronized manner relative to the servo data signals 310. The cell data signal 316 is produced in a manner which is relatively error tolerant, thereby ensuring reliability in reproducing data signals from the variable and asynchronous environment of the rotating disk 60. The digital PLL synchronizer 312 represents one of the significant improvements of the present invention, as discussed in greater detail below.

Another one of the significant improvements of the present invention is a detection circuit 318 for detecting the SAM 82 and SSM 84. The detection circuit 318 offers the capability to selectively relax the requirement of strict concurrence between the servo data pulses 310 and the pattern of signals indicating the SAM 82 and the SSM 84. As a consequence, should minor errors occur in writing or reading the SAM 82 or the SSM 84 in the servo field 76, for example, it is still possible to read and write data in the data field 78 following the servo field 76 in which the errors were detected. This improvement allows the normal operation of reading and writing data even though slight inconsistencies may be detected in the SAM 82 and SSM 84 fields, thus improving data throughput while still achieving an adequate level of error tolerance.

To implement the improvement of the detection circuit 318, a serial shift register ("SSR") 320 is employed. The SSR 320 is connected to the digital PLL synchronizer 312 and receives the cell data signal 316 and the cell clock signal 314. The SSR 320 assembles the serial cell data signals into multibit parallel signals 322 which are applied to the detection circuit 318. The detection circuit 318, after being enabled by a signal 274 from the SMS 126 (FIG. 7), detects the SAM 82 and the SSM 84 based on the signals 322. Upon detection of the SSM 84, the detection circuit 318 supplies the SSM found signal 220. An important aspect of the detection circuit 318 is a majority voter circuit, discussed in greater detail below.

To detect the index mark 86 and track number code 88 of the servo field 76, the servo decoder 124 includes a transition pattern decoder 324, a track number decoder 326, an index mark detector 328, a track number register 330, and an external data circuit 332. The transition pattern decoder 324 utilizes the cell data 316 and the cell clock 314 signals supplied from the digital PLL synchronizer 312, and decodes the Gray code transition patterns of the cell data 316. The decoded transition pattern is applied as a Gray Clock ("GC") data signal 334. The pattern decoder 324 also supplies a GC clock signal 336 based on the interval of the Gray code. The GC data signal 334 and the GC clock signal 336 are applied to the track number decoder 326 and to the index decoder 328.

The track number decoder 326 utilizes the GC data 334 and GC clock 336 signals to convert the Gray code transition patterns into track number information 338. The track number information 338 is supplied to the track number register 330, where it may be read over the bus 122. In a similar manner, the index mark detector 328 uses the GC data 334 and GC clock 336 signals to derive an index mark signal 340 which is available to be read over the bus 122. In addition, the index mark detector 328 includes a counter for counting the number of servo fields 76 encountered in the track 70 between subsequent index marks to thereby anticipate the next occurrence of an index mark on the track 70 and to determine if an error in the number of servo fields 76 counted in each track 70 has occurred. An error would occur from detecting an index mark when one was not anticipated or not detecting an index mark when one was expected. Upon detecting such an error, the index mark detector 328 will supply an interrupt signal 342 to be read by the DSP 142, the microcontroller 58 or the computer 56.

Each of these improvements in the servo decoder 124 is discussed more completely below.

Digital PLL Synchronizer

Figure 11B:
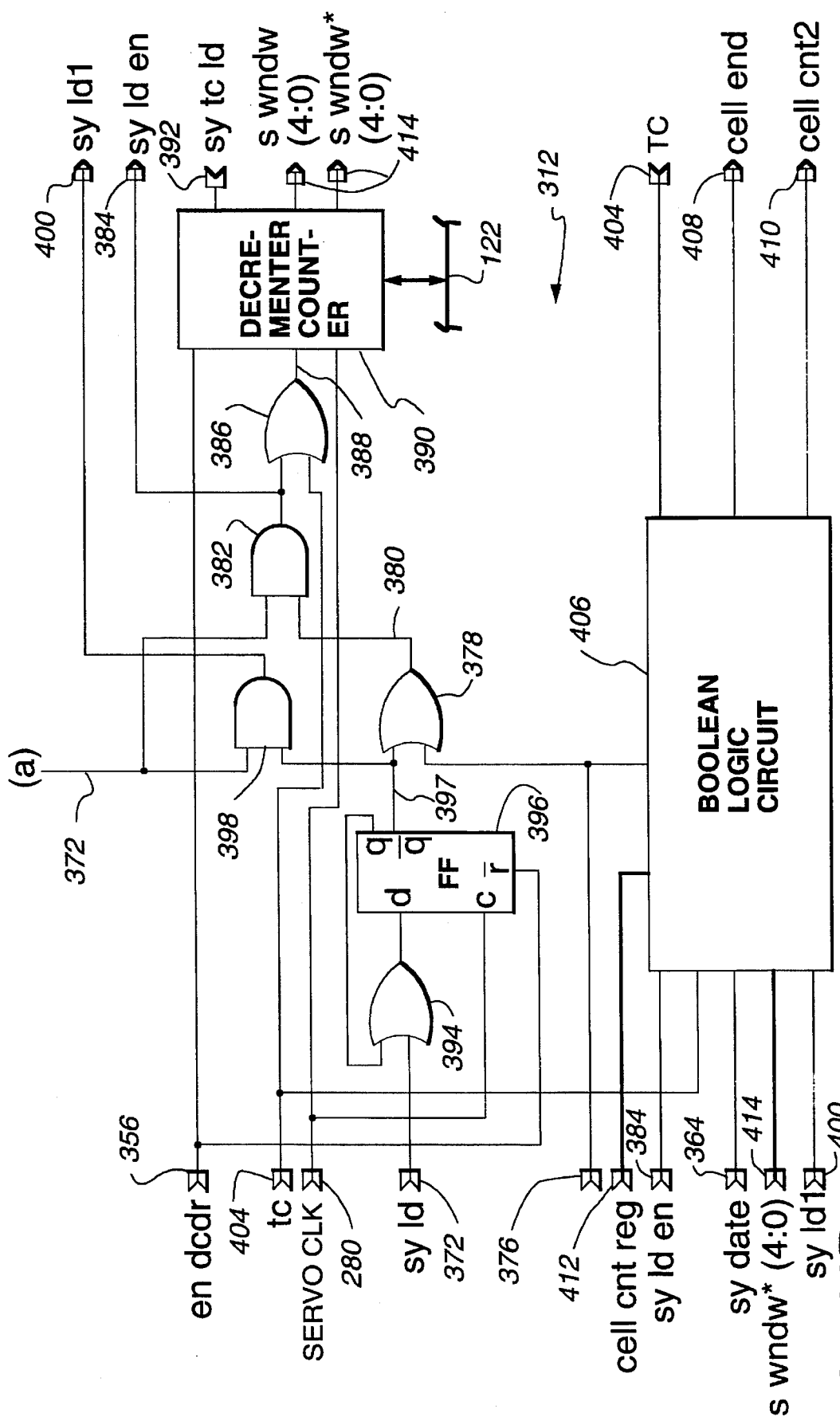

The digital PLL synchronizer 312 is shown in greater detail in FIGS. 11A and 11B. The digital PLL synchronizer 312 is enabled in response to the SSM search enable signal 274, delivered from the SMS 126, and commences operation in response to the SSM found signal 220 and a SMS start signal 348 (FIG. 11A). Operation of the digital PLL synchronizer 312 continues until the ending information from the servo field 76 is detected and a last bit signal is supplied at 350. Upon response to the SSM found signal 220, a D flip flop 352 provides an output signal to a NOR gate 354. The output of the NOR gate 354 is inverted by an inverter 355 and becomes an enable decoder signal 356. The enable decoder signal 356 is applied to the other elements of the digital PLL synchronizer 312 to enable its operation. (In the Drawings, the inversion of a signal is represented by an asterisk (*) following the signal name.)

The servo data signal 310 and the servo clock signal 280 are each applied to two servo data synchronizers 358 and 360 (FIG. 11A). The servo data synchronizer 358 is clocked with respect to the rising edge of the servo clock signal 280 during the presence of the servo data signal 310, while the servo data synchronizer 360 is clocked with respect to the falling edge of the servo data signal 310. An inverter 362 supplies an inverted servo clock signal 280 to achieve this relative clock timing. The output signals from the servo data synchronizers 358 and 360 are an sy data signal 364 and an sx data signal 366, respectively. Because the synchronizer 360 is triggered with respect to the falling edge of the servo clock 280, the sx data signal 366 is one-half of a servo clock period out of phase from the sy data signal 364.

The sx data signal 366 is applied to a flip flop 368 and the output of the flip flop 368 is supplied to one input of a MUX 370 (FIG. 11A). The flip flop 368 is used to re-align the sx data signal 366 with the rising edge of the servo clock pulses 280, since the sy data signal has previously been clocked from the falling edge of the servo clock signal 280. The other input to the MUX 370 is the sy data signal 364. The selection of one input signal by the MUX 370 is determined by a bit value 412 in a count register 112 (FIG. 5). A bit value low (0) signal in this count register determines whether there are an odd number of servo clock counts per cell width and a bit value high (1) signal indicates an even number of servo clock counts per cell. As will be described subsequently, the odd and even selection is utilized primarily to assure that the correct one of the sx data or sy data signals will be used for gating the logic to obtain the synchronization features of the digital PLL synchronizer 312.

A cell is that interval of time during which a servo data pulse from the read/write channel 72 will normally be received at the normal signalling frequency. The cell is thus the period of the normal frequency at which data is read from or written to the disk 60. As discussed previously, due to variations in disk rotational rates and due to variations in recording, the servo data pulses 310 sometimes occur asynchronously. However as a whole and during normal operating conditions, the servo data pulses 310 should occur generally at the normal signalling frequency, and the concept of the cell is the time width or period equal to the interval of the normal expected occurrence frequency of magnetic reversals. The servo clock signal has a frequency which is an integer multiple of the frequency related to the cell time width.

The output signal from the MUX 370 is an sy load (sy ld) signal 372. The sy load signal 372 is used to initiate the synchronization in both a free running or continuous mode of operation and in a resynchronization mode of operation. In the free running or continuous mode of operation, the cells are repeated at a continuous uniform rate. If a servo data signal occurs during the presence of a cell in the free running mode, it is clocked as a digital value. In the resynchronization mode of operation, the time length of the cells is adjusted relative to servo data pulses. In other words, the occurrence and duration of the cells is synchronized to the data pulses or expected data pulses. This latter mode of operation, referred to below as the "resynch" mode of operation, attempts to avoid corrupted data communication that would occur in the free running mode if the servo data pulses do not occur at the center of the time boundary of a cell. The free running or resynch mode is selected by the user as determined by a bit signal 376 (FIG. 11B) from a register 112 (FIG. 5). The free running mode is represented by a low level signal 376 while the resynch mode is represented by a high level signal 376.

In the case of both the free running and resynch modes of operation, it is necessary to initially start the operation of the digital synchronizer 312 by synchronizing to the occurrence of a first servo data signal 310, represented by the presence of a first sy load signal 372. The free running/resynch signal 376 is applied at an input terminal of an OR-gate 378 (FIG. 11B). In the resynch mode, the OR gate 378 supplies a continual high signal 380 to one input terminal of an AND gate 382. The sy load signal 372 is applied to the other input terminal of the AND gate 382. The sy load signal 372 is delivered each time a servo data pulse 310 is detected.

The output signal of the AND gate 382 is an sy load enable (sy ld en) signal 384 which, when applied through an OR gate 386 as a signal 388 causes a decrementer counter 390 to be jammed with a predetermined terminal count value (sy tc ld) supplied at 392. In the resynch mode, the jammed terminal count value 392 will be a value equal to one-half the normal length of a cell. For those cells in which no servo data pulse has been detected, the counter 390 will be jammed at the beginning of the cell with a value at 392 initiating a full width cell time period.

Upon application of the sy load signal 372, the terminal count value 392 will be loaded into the counter 390 and it will commence counting down from that value in response to servo clock signals 280. In this manner, the decrementer counter 392 provides a windowing opportunity extending over the cell time period to enable clocking the detected servo data signals 310 on a synchronous basis. An output window signal 414 from the counter 390 is supplied to define the time limits of this window opportunity. The windowing begins generally at the beginning of the cell and generally terminates at the end of the cell. In the resynch mode shown in FIGS. 12A–12G, the window (FIG. 12D) encompasses substantially a complete cell. In the free running mode, the window (FIG. 13D) occurs generally over the duration of each cell, as shown in FIGS. 13A–13F.

To initiate both the free running or continuous mode, the sy load signal 372 from the first servo data pulse after starting is detected and applied to an OR gate 394 (FIG. 11B). The OR gate 394 is connected to a flip flop 396. The Q output signal from the flip flop 396 is fed back to the OR gate 394, thereby causing, on the next servo clock signal 280, the not Q output signal 397 of the flip flop 396 to remain high thereafter. The not Q output signal from the flip flop 396 is applied to one input terminal of an AND gate 398 and to the other input terminal of the NOR gate 378.

Prior to the presence of the not Q output signal 397 at the input terminal of the AND gate 398, the sy load signal 372 has previously been applied to the other input terminal of the AND gate 398. In this condition the not Q output of the flip flop 396 was high resulting in the immediate delivery of an sy load 1 (sy ld1) signal 400 from the AND gate 398. The sy load 1 signal 400 enables the initial value to be jammed into the decrementer counter 390 so that the initial timing of the cells will be established in response to the first servo data pulse 310.

After delivery of the sy load 1 signal, the flip flop 396 is clocked on the next servo clock signal 280 to provide a low not Q output signal 397. The resulting low level signal 397 supplied to the AND gate 382 from the OR gate 378 will prevent the application of the sy load signal 388 through the OR gate 386 to the decrementer counter 390. Instead, a terminal count (tc) signal 404 is applied through the OR gate 386 and to the counter 390 to cause a count representative of the full width of the cell to be loaded into the decrementer counter 390. This loaded terminal count value establishes the end point of the cell.

A Boolean logic circuit 406, which is implemented as programmable array logic, derives a cell end signal 408 and a cell count 2 (cell cnt2) signal 410. The cell count 2 signal 410 is used to obtain the window information when the cell is two servo clocks in width. A cell width of two servo clocks is a particularly difficult timing situation because it may be difficult to determine whether a servo data pulse occurred within the first half or last half of the cell, and accordingly whether the servo data pulse should be attributed to the preceding, following or present cell. It is for this reason, among others, that the two servo data synchronizers 358 and 360 are triggered off the rising and falling edges of the servo clock signal 280. The two synchronizers 358 and 360, which are triggered at different times, establish an apparent doubling of the frequency to obtain the resolution for adequate synchronization. Other inherent signal propagation delay factors are considered in the Boolean logic circuit 406.

The input signals to the Boolean logic circuit 406 include multibit signals 412 from a register 112 (FIG. 5) which represent the number of servo clock signals 280 which establish the cell width. In the cell count signal 412, the least significant bit indicates whether the cell count requires an odd or even number of servo clocks per cell. The sy load enable signal 384, the terminal count signal 404, the sy data signal 364, the output signal 414 from the decrementer counter 390, the sy load 1 signal 400, and the free running or resynch signal 376 are also applied to the Boolean logic circuit 406.

Using these input value signals, the Boolean logic circuit 406 implements the Boolean equation in the following chart:

| Boolean Logic Circuit (406) Equation |
| --- |
| let x = s_wndw*[4] & s_wndw*[3] & s_wndw*[2] & s_wndw*[1] |
| tc = x & (s_wndw*[0] + cell_cnt_reg13b*[0]) |
| let y = cell_cnt_reg13b*[3] & cell_cnt_reg13b*[2] & cell_cnt_reg13b*[1] & cell_cnt_reg13b*[0] |
| cell_end = (sy_ld_en & sy_data + sy_ldl) & y + tc |
| cell_cnt2 = y & reg0e_2 |

In this Boolean equation, the "&" is a logical AND operation and the + is a logical OR operation, and the numbers in the brackets ("[ ]") following the signal represent the signal levels in the bit positions indicated within the brackets.

The values loaded into the decrementer counter 390 are set forth in the Count Values table below. These values are determined based on the number of servo clocks 280 for each cell (shown in the table in Hexadecimal code). The column "Cell Count" describes the number of servo clocks per cell. The column "sy ld" describes the number of servo clock counts loaded to represent the end of the cell from the occurrence of the sy load signal 372 when operating in the resynch mode. The column "tc ld" describes the number of servo clock counts loaded to represent the end of the cell from the end of the preceding cell when operating in either the free running or the resynch mode. Thus the tc ld value gets loaded into the decrementer counter 390 at the beginning of each cell in both the resynch and free running modes, but in the resynch mode the sy ld value gets loaded during the cell to override the tc ld value and to establish the end of the cell.

| Count Values | | |
| --- | --- | --- |
| Cell_Count | s_ld | tc_ld |
| 2 | 2 | 2 |
| 3 | 0 | 2 |
| 4 | 1 | 4 |
| 5 | 1 | 4 |
| 6 | 2 | 6 |
| 7 | 2 | 6 |
| 8 | 3 | 8 |
| 9 | 3 | 8 |
| A | 4 | A |
| B | 4 | A |
| C | 5 | C |
| D | 5 | C |
| E | 6 | E |
| F | 6 | E |
| 10 | 7 | 10 |
| 11 | 7 | 10 |

The sy ld and tc ld values from the Count Value table are derived from the logic circuit shown in FIG. 14. Input signals to the logic circuit are derived from the four least significant bits [3] through [0] of the cell count register 114. The cell count information stored in the cell count register is established by the user.

The logic circuit shown in FIG. 14 utilizes the signals 412 from the cell count register and inversions of some of the signals to derive the sy ld value and supply it on a bus 420. In a similar manner, the tc ld value is derived and presented on the bus 422. These signals on the buses 420 and 422 are applied to two input terminals of a MUX 424. The sy load enable signal 384 controls the MUX 424 to supply either the sy ld value on bus 420 or the tc ld value on bus 420 as the output sy tc ld signal 392. The state of the sy ld signal 392 during the free running or continuous mode controls the value supplied by the MUX 424. The sy ld value on bus 420 become the sy tc ld signal 392 during the free running mode, but both the sy ld value and the tc ld value become the sy tc ld signal 392 at different times during each cell during the resynch mode of operation.

Referring back to FIG. 11B, the timing of the cell end signal 408 obtained from the Boolean logic circuit 406 is a combination of the function of the terminal count value of each cell plus an time delay offset necessary for the propagation of the signals through portions of the digital PLL synchronizer 312. The derivation of the cell end signal 408 by the Boolean logic circuit 406 assures that the cell clock signal 314 is generated on a constant-frequency, regular-interval basis. The cell end signal 408 assures that the cell clock signal 314 will have these characteristics. The cell clock signal 314 is used for clocking all other logic functions within the digital PLL synchronizer 312.

The derivation of the cell clock signal 314 and the cell data signal 316 is shown in FIG. 11A. At the end of the preceding cell, the cell end signal 408 goes low. The state of a flip flop 430 at its Q output also goes low with the next servo clock pulse 280, causing a high not Q output signal 432. The high signal 432 is applied to an OR gate 434 whose output is connected to a write/enable (W/E) terminal of a write/enable (WE) flip flop 436. The resulting high input signal to the WE terminal of the WE flip flop 436 will result in the flip flop 436 clocking the input signal applied to its D terminal to its Q output terminal, upon the application of the next servo clock signal 280. The signal from the Q output terminal of the flip flop 434 when passed through the logic gates, becomes the cell data signal 316.

The cell data signal 316 is based on the sy data signal 364 supplied by the rising edge servo data synchronizer 358. Upon the occurrence of a high level sy data signal 364 (derived from a servo data signal 310) the high level sy data signal 364 will be applied through a NOR gate 438 to an inverter 440 and to the D input terminal of the flip flop 436 as a raw cell data signal 442. The not Q output signal 432 from the flip flop 430 is also applied to one input terminal of a NOR gate 444. The output signal from the NOR gate 444 is applied to one input terminal of a NOR gate 446. The output signal of the NOR gate 438 is applied to the other input terminal of the NOR gate 446. These two input signals result in a high signal applied to the D input terminal of a flip flop 448. Upon the next occurrence of a servo clock pulse 280, the Q output of flip flop 448 is applied to the NOR gate 438, thereby clearing the high raw data signal 442 at the D input terminal of flip flop 436. Therefore, under these conditions when a high sy data signal 364 occurs, the cell data signal 316 will go high within one servo clock signal 280 thereafter.

The cell data signal 316 will remain high until the raw cell data signal 442 at the D input terminal of the WE flip flop 436 goes low after the cell end signal 408 is applied. The not Q output signal 432 from the flip flop 430 goes low after the cell end signal 408 is applied. The low signal 432 is applied to one input terminal of the NOR gate 444. Once the low signal 432 is applied to the NOR gate 444, the resulting output signal will cause the NOR gate 446 to supply a high output signal to the D input terminal of the flip flop 448. A resulting high output signal from the flip flop 448 to the NOR gate 438 will cause a low output signal from the NOR gate 438. The low signal from the NOR gate 438 is inverted by the inverter 440 to apply a high level signal at the D input terminal of the WE flip flop 436. The high level signal 432 allows the flip flop 436 to be clocked with the next servo clock pulse 280, and the flip flop changes state to terminate the cell data signal 316.

Once the flip flop 430 has been clocked from the cell end signal 408, its Q output signal is applied to the D input terminal of a flip flop 450. When the cell clock signal 314 goes high as established by the output signal from the Q output terminal of the flip flop 450, the OR gate 434 will supply a high signal to the WE terminal of the flip flop 436, allowing the flip flop 436 to be cleared upon the application of the next servo clock signal 280. This assures that the cell data signal 316 will be sampled during the presence of, and before the end of, the cell clock signal 314. The cell clock signal 314 ends with the presence of the next servo clock signal 280. The cell clock signal 314 ends at a servo clock interval after it is assured that the cell data signal 316 can be sampled.

Although the cell clock signal 314 normally has a time interval of at least one period of a servo clock signal 310, in the situation where two servo clock signals define a cell, the cell clock signal 314 is not the full width of a servo clock interval. In the situation where the cell equals two servo clock counts, the cell count 2 signal 410 is applied to the NOR gate 452 (FIG. 11A) which terminates the cell clock signal 314 before the full time interval of a servo clock signal has elapsed. An example of the relationships of the nominal cell width, a servo data signal 310, a cell data signal 316, a window established by the counter 390 and the Boolean logic circuit 406, a cell clock signal 314, a cell end signal 408 and the adjustment to resynchronize are shown in FIGS. 12A to 12G, respectively.

Similar functions of the digital PLL synchronizer 312 occur in the free running or continuous mode of operation. In the free running mode, the periodicity of the cell clock signals 314 and cells is established and maintained in a continuous, regularly occurring relationship. The presence of the cell end signal 408 appears prior to the end of the defined cell clock period. The sy data signal 364 is stretched or maintained at a high level until the presence of the cell clock signal 314 at the end of the cell period. An example of the functionality of the relationships of the normal cell, a servo data signal 310, a cell data signal 316, a window established by the counter 390 and the Boolean logic circuit 406, a cell clock signal 314 and a cell end signal 408 in the free running mode is shown by FIGS. 13A to 13F, respectively.

The operation of the servo data synchronizers 358 and 360 is appreciated from the circuit diagram of each shown in FIG. 15. Each servo data synchronizer 358 or 360 includes two parallel sections, an upper section and a lower section, each of which operates essentially the same. An input flip flop 460 is provided to toggle sequential input servo data signals 310 between the upper section which includes flip flops 462, 466 and 470, and the lower section which includes flip flops 464, 468 and 472. This toggling feature of the flip flop 460 enables the capture of two high servo data signals 310 which may be applied asynchronously in a closely-spaced relationship. By toggling between the upper and lower sections, both of the closely spaced servo data pulses 310 will be captured and clocked into the digital PLL synchronizer 312.

The toggling function of the flip flop 460 is achieved by the feedback connection between its not Q output terminal and its D input terminal. The servo data signals 310 are used to clock the flip flops 460, 462 and 464. The flip flop 460 applies only one high signal to the D input terminal of one of the flip flops 462 or 464 at a time. The one flip flop 462 or 464 to which a high signal at the D input terminal is applied will be clocked by the servo data signal 310.

The servo clock signal 280 is applied to clock the flip flops 466, 468, 470 and 472. After setting the first flip flop 462 or 464 in each section, the subsequent flip flops 466 and 470 in the upper section and the subsequent flip flops 468 and 472 in the lower section will be clocked based on the servo clock signals 280. The output of the last flip flop 470 or 472 in the upper and lower sections is applied to an input inverting NAND gate 474. Thus, one output signal 364 or 366 will be available from either of the upper or lower sections. This output signal will be an sy data signal 364 or an sx data signal 366 depending the synchronizer 358 or 360, respectively.

After the presence of an output signal 364 or 366, a NOR gate 476 or 478 associated with each section clears the first two flip flops in each section with the application of the next servo clock signal 280 and the next servo data signal 310. In this manner, one section is cleared with the application of the servo data signal 310 while the other section responds to the servo data signal.

As apparent from the preceding discussion, the digital PLL synchronizer 312 operates in the resynch mode to synchronize to each servo data signal, thereby adjusting the length of the cell. This adjustment is more likely to accommodate the successful recognition of the next servo data pulse, even when received asynchronously. The toggling nature of the servo data synchronizers 358 and 360 allow closely spaced, asynchronously-occurring servo data pulses to be captured with greater reliability. The functionality of deriving the cell clock signals on a regularly occurring basis but within cell windows achieves a reliable capture of the information represented by the servo data signals. These advantages are inherently obtained from any cell width which the user selects to match the particular signalling frequency of the disk drive. These same advantages, except for resynchronization, are obtained in the free-running mode, which the user may also select.

Majority Voter

Another one of the significant improvements of the servo decoder 124 is the capability to selectively relax the requirement of strict concurrence of the anticipated pattern of signals for the SAM 82 and SSM 84 (FIG. 4) and the actual pattern of signals read from the SAM 82 and the SSM 84. As a result of this improvement, minor errors in recording in the SAM 82 or the SSM 84, the effects of some minor amounts of noise or a few missed pulses in the detection of the SAM 82 and the SSM 84 still makes it possible to read and write data in the following data field 78 (FIG. 3). Thus, this improvement of the present invention allows normal data reading and writing to occur even though slight inconsistences maybe be found in the control information read from the SAM 82 and the SSM 84.

To implement this improvement of the present invention, the servo decoder 124 utilizes the SSR 320 and the detection circuit 318, shown in FIG. 10. The SSR 320 is connected to the digital PLL synchronizer 312 and receives the cell data signal 316 and the cell clock signal 314. As has been explained previously, the cell data signal 316 is derived from the servo data signal 310, and the cell clock signal 314 is derived for use in clocking the information contained in the cell data signal 316.

The operation of the SSR 320 and detection circuit 318 are illustrated in FIG. 16. The cell data signal 316 and cell clock signal 314 are applied to the SSR 320 which shifts in the cell data signals 316 serially based on the cell clock signal 314. Thus, a multibit output signal 480 is available from the SSR 320, and this signal 480 represents the serial cell data signals shifted into the SSR 320. The SSR output signal 480 is applied to one input of a comparator 482. The other multibit input signal 486 to the comparator 482 is supplied from a pattern register 484. The pattern register 484 contains information, supplied from the bus 122 from the microcontroller 56 or computer 58, defining the anticipated pattern of signals representing the SAM 82 and the SSM 84. Although a single pattern register 484 is illustrated in FIG. 16, a separate pattern register 484 may be used for the SAM 82 and for the SSM 84. Alternatively, the microcontroller 58 or comparator 56 may reload the single pattern register 484 with different information from the bus 122 between detection of the SAM 82 and the SSM 84. When two separate registers 484 are employed, a controllable switch (not shown) is used to select between two pattern registers to apply the appropriate signal to the comparator 482 at the appropriate time.

The comparator 482 compares the levels of signals 480 and 486 at corresponding bit locations. The level of each bit of a multibit output signal 488 from the comparator 482 represents the correspondence between the corresponding bits of the input signals 480 and 482. Correspondence between the two corresponding bits of the multibit input signals 480 and 486 results in a high level bit of the signal 488 on the corresponding bit line from the comparator 482. A failure of the corresponding bits of the two input signals 480 and 486 is represented by a zero. Thus, the output signal 488 from the comparator 482 represents matches between the bit pattern actually read (signal 480) and the anticipated correct bit pattern (signal 486).

The output signal 488 from the comparator 482 is supplied to a tally circuit 490. The tally circuit 490 adds the number of matches represented by the signal 488, and supplies an output signal 492 which represents in binary code, the corresponding number of bit matches represented by the signal 488. For example, if an eight bit input signal 488 is supplied to the tally circuit 490, a four bit output signal 492 from the tally circuit 490 will represent in binary code the numbers 0 to 8.

The output signal 492 from the tally circuit 490 is applied to another comparator 494. Another input signal 496 to the comparator 494 is supplied from a threshold register 498. The threshold register 498 is loaded with information from the bus 122. The information contained in the threshold register 498 constitutes a threshold value and is selectable by the user. The threshold value allows the user to establish the degree of concurrence for recognition of the SAM 82 and the SSM 84. For example, the value in the threshold register may require an 80% concurrence between the read bit signals and the anticipated correct bit signals. The threshold value in the register 498 may be changed for recognizing each of the SAM 82 and SSM 84 fields, by reloading a single register or using two separate registers, in a similar manner to that previously described with respect to the pattern register 484.

So long as the threshold value represented by signal 496 is met or exceeded, a threshold met signal 500 is delivered and normal operation proceeds. Because of the additive and thresholding features of the detection circuit 318, it is sometimes also referred to herein as the "majority voter".

More details regarding the majority voter or detection circuit 318 are shown in FIG. 17. The multibit signal 480 representing the detected SAM 82 or SSM 84 is available from the SSR 320. Similarly, the multibit signal pattern 486 of the SAM 82 or SSM 84 is applied from the pattern register 486. Corresponding bits from the signals 480 and 486 are applied to input terminals of exclusive NOR gates 510. An output signal from each of the gates 510 will be high when both corresponding bit signals from the signals 480 and 486 are in the same high or low condition. When the corresponding bit signal levels from the signals 480 and 486 are different, the gates 510 supply a low signal. Each high output signal from the gates 510 represents a match or concurrence while each low level signal from the gates 510 represents a mismatch.

The output signals 514 from the gates 510 are applied as input signals to the tally circuit 490. The tally circuit is also shown in greater detail in FIG. 18. Eight individual bit signals 514 (in 0 to in 7 in FIG. 18) are applied to four full adders 516, 518, 520 and 522, and to three half adders 524, 526 and 528. The full and half adders have their a and b input terminals, their carry in terminals (ci), their carry out terminals (co), and their sum terminals connected together in the manner shown. Connected in this manner, the tally circuit 490 adds the input signals 514, and supplies a four bit binary output signal 492 representative of the addition of the number of high level signals at the eight input terminals. The binary output signal 492 is applied at terminals out 0, out 1, out 2 and out 3.

Referring back to FIG. 17, the threshold pattern for a SAM is applied from a SAM threshold register 498*a* to one input terminal of a MUX 536, and the threshold pattern for the SSM is applied from a SSM threshold register 498*b* to the other input terminal of the MUX 536. A control signal 538 controls the MUX 536 to select between the two input signals from the registers 498a and 498b and supply the selected signal to comparators 530, 532 and 534.

Each of the comparators 530, 532 and 534 compares the corresponding bits of the binary output signal 492 from the tally circuit 490 with the bit signals from the selected register 498a or 498b. The comparators 530, 532 and 534 are connected to enable a determination of the most significant bit. For example, assume that the comparator 530 indicates a match between the bit signal supplied from the selected register 498a or 498b and the corresponding bit signal supplied from the tally circuit 490. The output signal from that comparator will enable the comparator 532 to make a determination. If the comparator 532 determines that the bit signal from the tally circuit 490 is greater than the bit signal from the selected register, the threshold met signal 500 will be delivered. In general, this interconnection shifts the determination to the comparator representing the most significant digit where a match is not present. The last comparator 538 has its lower input connected to reference potential so the presence of a high level of bit signal from the tally circuit 490 will result in delivery of the threshold met signal 500. Thus, the comparator 494 determines comparisons based on the most significant digit of a binary signal 492 from the tally circuit 490. The threshold met signal 500 is supplied when the comparison is greater than the threshold value.

Once the threshold met signal 500 is delivered, it is applied to reset the SSR 320 to enable the SSR 320 to begin shifting in signals for the next SAM 82 or SSM 84. The threshold met signal 500 causes the SSM found signal 220 to be delivered when the SSM 84 pattern is appropriately detected.

It is apparent that the servo data signals read from the disk may be recognized as representing the SAM 82 and the SSM 84 even though there is no strict concurrence between the pattern detected and the actual pattern. Provided that the detected SSM 84 and SAM 82 signals represent a sufficient amount of concurrence, as represented by a threshold value selected by the user, reading and writing of data can proceed under circumstances where the user has determined that a sufficient concurrence is warranted to justify continued operation. As a result, the data throughput may be enhanced over those circumstances where strict concurrence would otherwise inhibit or prevent reading or writing of data.

Operation of the servo decoder 124 in detecting the SSM 84 and the SAM 82 is illustrated by the state diagram shown in FIG. 19, where the state transitions of the servo decoder 124 during SAM 82 and SSM 84 field detection are illustrated.

Upon initialization of servo decoder 124, an asynch reset signal 550 causes servo decoder 124 to enter a wait state 552. When a preamble 80 has not been detected (after a previous servo field 76 has been detected as represented by an indication 554), a loop at the state 552 occurs. When the preamble 80 of the servo field 76 is detected at 556, a transition from the wait state 552 occurs.

If the user has programmed one SAF to be detected as the SAM 82 in each servo field 76, a detect one SAF state 558 is entered. A threshold not met indication 560 while in this state will cause a loop at the state 558 until a threshold met indication 562 causes a transition to a detect SSM state 564. A threshold not met indication 566 causes a loop in the detect SSM state 564 until the SSM threshold is met, at which time a SSM found signal 220 is delivered.

On the other hand if the user has programmed two SAFs for detection of the SAM 82, the transition 556 from the wait state 552 will be to a detect two SAFs state 568. In a similar manner, while the thresholds for the two SAFs have not been met, a loop at 570 continues in the state 568. When both SAFs have been validly detected, a transition 572 to the detect SSM state 564 occurs, where the previously described SSM 84 detection and threshold events occur.

However, if the user does not employ a SAM in the servo field or wishes to bypass its recognition, and hence no SAM is programmed for detection, the transition at 556 is to a detect no SAM state 574. A loop 576 may or may not be executed at the state 574, depending on timing or other considerations selected by the user. Upon meeting the conditions for a transition 578, the detect SSM state 564 is entered, and the previously described operation re-occurs.

Track Number and Index Detector

Another improvement available from the servo decoder 124 is an enhanced capability to detect the track number code 88 in the servo field 76 (FIG. 4). The track number code 88 identifies the number of the track 70 and its physical location on the disk 60.

The track number code 88 is represented by magnetic reversals recorded in the track number field. The magnetic reversals produce the servo data pulses 310 which are detected by the head 62 and processed by the read/write channel 72. The magnetic transitions are recorded to create a Gray code for the track number. The use of the Gray code is particularly advantageous for determining track numbers. For example, in movement of the head 62 across the tracks 70 in a seek operation, at least one track number code of all the adjacent tracks encountered will usually be detected during movement across the disk. Decoding the track number code determines whether the desired position of the head 60 has occurred. By monitoring the track number codes, it is also possible to determine whether an error has occurred if the code from one track 70 to the next has changed by more than one.

The functional objective of the Gray coded track number is to cause no more than one bit of the code to change from one adjacent track number to another. By assuring that no more than one bit of code will change, there is an enhanced assurance that track number detection errors can be recognized by the conventional logic circuits which monitor track numbers.

A similar circumstance exists with respect to the index mark appearing once in the index fields present in each track. The index mark is also defined by a pattern of magnetic reversals. An index mark signal is supplied each time the index mark is detected. The index mark signal is used to count the number of servo fields 76 on each track 70. For example, a typical number of servo fields 76 on each track 70 is 50. Upon detection of the index mark, a counter will be enabled and each subsequently detected servo field 76 will increment the counter. When the next index mark on that track 70 is subsequently detected, if the count represented by the index counter is not consistent with the number of servo fields 76 recorded on the track, 50 in this example, an error interrupt signal will be generated.

The servo decoder 124 supports a plurality of, for example three, different types of magnetic reversal or transition patterns as Gray coding techniques for determining track numbers and index marks. One type of transition pattern coding supported is a dibit transition pattern shown in FIG. 20. The code represented by the transition pattern, and the track number represented by the code, are also shown in FIG. 20. In the dibit transition pattern, each code element requires two cells.

Another type of transition code supported by the servo decoder 124 is known as a pulse position code with a three cell repeating pattern (PPC(3)). The PPC(3) code has a marker in a cell at the beginning of each transition pattern. The transition pattern, code and track number information of a PPC(3) code are shown in FIG. 21.

The third type of transition pattern code supported by the servo decoder 124 is a pulse position code with a two cell repeating pattern (PPC(2)). The PPC(2) transition pattern, code and track number are shown in FIG. 22. The PPC(2) code is similar to the PPC(3) code except that the beginning marker cell is eliminated, thereby increasing code efficiency. In the PPC2 and the PPC3 codes, a transition from a 0 to a 1 is equal to a 0 level bit signal, and a transition from a 1 to a 0 is equal to a 1 level bit signal.

The dibit, PPC(3) and PPC(2) codes are inherently run length limited (RLL) with (0,4), (0,1) and (0,2) constraints, respectively. Since many conventional disks have in excess of 2,000 tracks, it is necessary to provide an adequate number of transition patterns in the track number code of the servo field 76 to identify each track 70. Thirty-six coded cells are required for 12 bits of track number. Twelve bits of track number are required to identify approximately 2,000 tracks recorded on a storage disk. In order to obtain the 12 bit track number, the code derived from each of two or three cell pattern is concatenated.

The Tables below show the coded transitions, octal equivalents and track numbers for 12 bits of track numbers (2048) tracks) for the dibit and the PPC(3) transition codes. PPC(2) code is similar to that shown in the PPC(3) Table, except that the marker has been eliminated.

| Track Number | Octal Equivalent | Gray coded Transitions (pulse pattern) |
|---|---|---|
| | | Dibit 12 Bit Track Number Table |
| 0 | 0,0,0,0 | 11111111 11111111 11111111 11111111 |
| 1 | 0,0,0,1 | 11111111 11111111 11111111 11111100 |
| 2 | 0,0,0,2 | 11111111 11111111 11111111 11001100 |
| 3 | 0,0,0,3 | 11111111 11111111 11111111 11001111 |
| 4 | 0,0,0,4 | 11111111 11111111 11111111 11000011 |
| 5 | 0,0,0,5 | 11111111 11111111 11111111 11110011 |
| 6 | 0,0,0,6 | 11111111 11111111 11111111 00110011 |
| 7 | 0,0,0,7 | 11111111 11111111 11111111 00111111 |
| 8 | 0,0,1,7 | 11111111 11111111 11111100 00111111 |
| 9 | 0,0,1,6 | 11111111 11111111 11111100 00110011 |
| 14 | 0,0,1,1 | 11111111 11111111 11111100 11111100 |
| 15 | 0,0,1,0 | 11111111 11111111 11111100 11111111 |
| 16 | 0,0,2,0 | 11111111 11111111 11001100 11111111 |
| 17 | 0,0,2,1 | 11111111 11111111 11001100 11111100 |
| 23 | 0,0,2,7 | 11111111 11111111 11001100 00111111 |
| 24 | 0,0,3,7 | 11111111 11111111 11001111 00111111 |
| 25 | 0,0,3,6 | 11111111 11111111 11001111 00110011 |
| 26 | 0,0,3,5 | 11111111 11111111 11001111 11110011 |
| 30 | 0,0,3,1 | 11111111 11111111 11001111 11111100 |
| 31 | 0,0,3,0 | 11111111 11111111 11001111 11111111 |
| 32 | 0,0,4,0 | 11111111 11111111 11000011 11111111 |
| 33 | 0,0,4,1 | 11111111 11111111 11000011 11111100 |
| 62 | 0,0,7,1 | 11111111 11111111 00111111 11111100 |
| 63 | 0,0,7,0 | 11111111 11111111 00111111 11111111 |
| 64 | 0,1,7,0 | 11111111 11111100 00111111 11111111 |
| 1023 | 1,0,0,0 | 11111100 11111111 11111111 11111111 |
| 1024 | 2,0,0,0 | 11001100 11111111 11111111 11111111 |
| 1025 | 2,0,0,1 | 11001100 11111111 11111111 11111100 |
| 2046 | 3,0,0,1 | 11001111 11111111 11111111 11111100 |
| 2047 | 3,0,0,0 | 11001111 11111111 11111111 11111111 |

| Track Number | Octal Equivalent | Pulse Position coded Transitions (3 cell) |
|---|---|---|
| | | Pulse Position coded (3 cell) Track Number Table |
| 0 | 0,0,0,0 | 101101101 101101101 101101101 101101101 |
| 1 | 0,0,0,1 | 101101101 101101101 101101101 101101110 |
| 2 | 0,0,0,2 | 101101101 101101101 101101101 101110110 |
| 3 | 0,0,0,3 | 101101101 101101101 101101101 101110101 |
| 4 | 0,0,0,4 | 101101101 101101101 101101101 110110101 |
| 5 | 0,0,0,5 | 101101101 101101101 101101101 110110110 |
| 6 | 0,0,0,6 | 101101101 101101101 101101101 110101110 |
| 7 | 0,0,0,7 | 101101101 101101101 101101101 110101101 |
| 8 | 0,0,1,7 | 101101101 101101101 101101111 110101101 |
| 9 | 0,0,1,6 | 101101101 101101101 101101111 110101110 |
| 14 | 0,0,1,1 | 101101101 101101101 101101111 101101110 |
| 15 | 0,0,1,0 | 101101101 101101101 101101122 101101101 |
| 16 | 0,0,2,0 | 101101101 101101101 101110111 101101101 |
| 17 | 0,0,2,1 | 101101101 101101101 101110111 101101110 |
| 23 | 0,0,2,7 | 101101101 101101101 101110111 110101101 |
| 24 | 0,0,3,7 | 101101101 101101101 101110101 110101101 |
| 25 | 0,0,3,6 | 101101101 101101101 101110101 110101110 |
| 26 | 0,0,3,5 | 101101101 101101101 101110101 110110110 |
| 30 | 0,0,3,1 | 101101101 101101101 101110101 101101110 |
| 31 | 0,0,3,0 | 101101101 101101101 101110101 101101101 |
| 32 | 0,0,4,0 | 101101101 101101101 110110101 101101101 |
| 33 | 0,0,4,1 | 101101101 101101101 110110101 101101110 |
| 62 | 0,0,7,1 | 101101101 101101101 110101101 101101110 |
| 63 | 0,0,7,0 | 101101101 101101101 110101101 101101101 |
| 64 | 0,1,7,0 | 101101101 101101111 110101101 101101101 |
| 1023 | 1,0,0,0 | 101101111 101101101 101101101 101101101 |
| 1024 | 2,0,0,0 | 101110111 101101101 101101101 101101101 |
| 1025 | 2,0,0,1 | 101110111 101101101 101101101 101101110 |
| 2046 | 3,0,0,1 | 101110101 101101101 101101101 101101110 |
| 2047 | 3,0,0,0 | 101110101 101101101 101101101 101101101 |

The servo decoder 124 uses the transition pattern decoder and the track number decoder 326, shown in FIG. 10, to obtain the improved capability for detecting the track number code. The transition pattern decoder 324 responds to the cell data signal 316 and cell clock signal 314 supplied from the digital PLL synchronizer 312. The transition pattern decoder 324 also responds to the SSM found signal 220 supplied by the SAM/SSM detection circuit 318. In response to these input signals, the transition pattern decoder 324 supplies the GC data signal 334 and the GC data clock signal 336. The signals 334 and 336 are supplied to the track number decoder 326, from which the track number information signal 338 is supplied to the track number register 330.

The index mark detector 328 also responds to the GC data signal 334 and the GC clock signal 336 supplied from the transition pattern decoder 324, to supply the index mark signal 340 and the interrupt signal 342.

In those cases where the user elects not to use one of the transition pattern Gray codes supported by the servo decoder 124, a bypass signal 580 is supplied to the external data circuit 332. Under bypass conditions, the external data circuit 332 applies the servo data signal 310 as a bypass data signal 582 directly without conversion to the track number register 330 and to the index detector 328. Under bypass circumstances, the user may read the servo data signals directly from the register 330 without conversion in the servo decoder 124. The external data circuit 332 also supplies an external synch signal 584 in relation to the detection of synchronization information in the servo field 76. The external synch signal may contain information similar to the SSM 84, for example. Thus, the servo decoder 124 of the present invention also allows users to employ user-specific types of Gray codes.

The functionality of the transition pattern decoder 324, the track number decoder 326, the index mark detector 328, and the track number register 330 of the servo decoder 124 are explained in conjunction with FIGS. 23A, 23B and 23C. A divider 600 (FIG. 23A) determines the number of cells per each code marker bit in each of the Gray coded transition patterns previously described. The level of a signal applied at 602 from a register indicates whether two or three cells per each code marker bit will be employed in the selected Gray code.

The divider 600, which is enabled by the enable decoder signal 356, commences operation in response to a SSM found signal 220 and divides based on the cell clock signal 314. An output signal 604 from the divider 600 is used to derive the GC clock signal 336 when the user does not wish to bypass the inherent pattern decoding functionality of the servo decoder 124. The output signal 604 establishes the number of cells per Gray code marker.

The signal 604 is applied to one input terminal of a MUX 606 (FIG. 23B), and a bypass clock signal 608 is applied to the other input terminal of the MUX 606. The bypass clock signal 608 is derived from a user specified clocking frequency related to whatever type of user-specific Gray code which may be selected. The bypass signal 582 controls the MUX 606, and when the bypass mode of operation is not selected the signal 604 becomes the GC clock signal 336 after passing through the MUX 606 and other logic gates.

The cell data signal 316 is applied to the transition decoder circuit comprising flip flops 610 and 612 (FIG. 23A). The cell clock signal 314 is also supplied to the flip flops 610 and 612. The cell data signal 316 sets the flip flop 610 in response to the GC clock signal 336 (gc clk) and sets the flip flop 612 in response to the one output signal 614 from the divider 600. The flip flops 610 and 612 and their associated logic circuitry directly convert the pattern represented by the cell data signal 316 into the GC data signal 334.

The GC data signal 334 is applied to an exclusive OR gate 616 (FIG. 23B), and the output from the exclusive OR gate 616 is applied to one input terminal of a MUX 618. The servo data signal 310 is applied to the other input terminal of the MUX 618. The bypass signal 582 controls the MUX 618. When the bypass mode is selected by the level of the signal 582, the MUX 618 supplies the servo data signal 310 directly to a track number shifter 620 (FIG. 23C).

When the PPC(2) and PPC(3) codes are selected, the GC data signal 334 is supplied by the MUX 618 to the track number shifter 20. When the dibit transition code is selected, the GC data signal 334 is applied to the input terminal of the first of four serially-connected flip flops 622, 624, 626 and 628 (FIG. 23B). GC data signals 334 are serially shifted into the four flip flops 622–628, and a multibit output signal 630 from these four flip flops is applied to a four bit to three bit Gray code decode logic circuit 632. The logic circuit 632 converts the four bit signal 630 to a three bit signal 634 and applies it through an exclusive OR gate 636 (FIG. 23C) to the track number shifter 620.

In the situation where the user elects to bypass the pattern decoding functionality available from the servo decoder 124, the bypass clock signal 608 is supplied to clock the flip flops 622–628 (FIG. 23B). The multibit output signal 630 from these four flip flops is applied to the four bit to three bit Gray code decode logic circuit 632, and its three bit output signal 634 is supplied through the exclusive OR gate 636 (FIG. 23C) to the track number shifter 620.

As can be seen from the code transition patterns shown in FIG. 20, the four-bit dibit code is converted to the three-bit track number form. The logic circuitry to implement this conversion is readily apparent and is included in the decode logic circuit 632. In a manner appreciated in the art, the user may implement the necessary logic to decode any user-specific Gray code pattern in the decode logic circuit 632.

The function of the track number shifter 620 (FIG. 23C) is to shift three bits at a time out on the bus 122 to the input terminal of the track number register 330. The three bits shifted out at a time are read into sequential memory locations in the track number register 330 to concatenate the four groups of 3 bit signals from the shifter 620 into the 12-bit code necessary to represent the track numbers (as shown in the preceding Tables). One of the input signals 642 to the track number register 330 from one bit level signal conductor of the bus 122 indicates the PPC(2) and PPC(3) codes.

A control and timing circuit 646 (FIG. 23C) utilizes the various signals to account for the number of transitions, the shifting effect, the count of the servo fields in each track relative to the index mark, and to supply the last bit signal 350 at the conclusion of the last information (the track number code 88) of the servo field 80. The circuit 646 also supplies the interrupt 342 to the bus 122 when the count of servo fields relative to the index mark reveals an error. The derivation of the control and timing functions available from the circuit 646 is apparent from the previous description, and the circuit 646 may be implemented by use of conventional logic elements.

A conventional run length logic (RLL) violation circuit 648 is connected to the bus 122 to evaluate each set of three bits shifted from the track number shifter 620 into the track number register 330. By evaluating the three bits, it is possible to determine whether an error in detection of the transitions occurred by evaluating the three bits relative to the constraints of the particular code as shown in the Tables above. Should an error occur, two additional bit signals will be delivered from the RLL violation circuit 648 to the bus 122 and be recorded contiguously in the track number register 330 with the 12-bit code representing the track number, so as to enable the DSP 142, the microcontroller 58 or computer 56 to determine, over the bus 122, whether the track number information recorded in the register 330 is useable or reliable.

As is apparent from the previous description, a number of different types of Gray code transition patterns may be selected to be decoded by the user. The elements of the pattern decoder allow the number of cells per Gray code marker to be established. The pattern is readily decoded and made accessible at a register for the DSP 106, the microcontroller 58 or the computer 56. The user additionally has the option of bypassing the transition decoding capabilities if desired.

Presently preferred embodiments of the present invention and many of its improvements have been described with a degree of particularity. The previous description is of the preferred example for implementing the invention, but the scope of the invention should not necessarily be limited by this description. The scope of the present invention is defined by following claims.

The invention claimed is:

1. A servo system controller for a disk drive device including a rotating mass storage disk with a plurality of tracks having data field and servo field information recorded therein, a head to read information recorded in the servo and data fields, and a read/write channel for supplying servo data signals related to the information read by the head, said servo system controller comprising:

a timing error determining circuit responsive to servo data signals derived from corresponding information in sequential servo fields and operative to determine any variation in speed of movement of the information recorded on a track relative to the head between sequential servo fields, and to supply a timing error signal when the amount of variation is equal to or greater than a predetermined threshold timing value;

a digital synchronizer responsive to the servo data signals delivered asynchronously about a normal frequency and operative to establish a regularly occurring cell clock signal occurring at the normal frequency, to establish a cell during which only one servo data signal will occur and during which at least one cell clock signal occurs, and to establish a cell data signal which is related to the servo data signal and which occurs during the cell, the cell clock signal clocking logical operations associated with the cell data signal in said servo system controller; and a concurrence determining circuit, including a majority vote detector, responsive to a predetermined series of cell data signals related to servo data signals derived from information within the servo field and operative to determine the degree of concurrence between the predetermined series of cell data signals and an actual pattern of signals corresponding to the same information within the servo field, and to supply a threshold met signal when the degree of concurrence is equal to or greater than a predetermined threshold concurrence value less than complete concurrence; and wherein:

the timing error signal and the threshold met signal contribute to establishing an operative condition by which to evaluate the accuracy of cell data signals clocked from reading of the data field between sequential servo fields.

2. A servo system controller as defined in claim 1 wherein the servo field includes a servo synch mark (SSM) field which is defined by a predetermined pattern of transitions representing signals, and wherein:

the concurrence determining circuit is further operative to supply a SSM found signal in response to the threshold met signal obtained from cell data signals derived from the SSM; and the timing error determining circuit responds to the SSM found signal to determine the amount of variation in speed and to supply the timing error signal.

3. A servo system controller as defined in claim 1 further comprising:

a clock for supplying a servo clock signal at a frequency which is greater than the normal frequency of the servo data signals; and wherein:

the concurrence determining circuit and the timing error determining circuit each include at least one register in which to store the predetermined threshold timing value and the predetermined concurrence value, respectively;

the digital synchronizer establishes the cell based on a predetermined number of servo clock signals, and the digital synchronizer includes a register in which to store a cell count value indicative of the predetermined number of servo clock signals which establish the cell; and the predetermined threshold, concurrence and cell count values stored in the registers are selectively changeable.

4. A servo system controller as defined in claim 1 wherein the servo field includes at least one servo address mark (SAM) and a servo synch mark (SSM) which are each defined by a predetermined pattern of transitions representing signals, and wherein:

the concurrence determining circuit is further operative to supply a SAM detected signal in response to the threshold met signal obtained from cell data signals derived from the SAM and to supply a SSM found signal in response to the threshold met signal obtained from cell data signals derived from the SSM;

the concurrence determining circuit further includes registers in which to store predetermined SAM and SSM values representative of the actual pattern of signals corresponding to the SAM and SSM, respectively;

the digital synchronizer establishes the cell based on a predetermined number of servo clock signals, and the digital synchronizer includes a register in which to store a cell count value indicative of the predetermined number of servo clock signals which establish the cell; and the predetermined SAM, SSM, threshold, concurrence and cell count values stored in the registers are selectively changeable.

5. A servo system controller as defined in claim 1 for use with a processor device which is operative to control said servo system controller by responding to interrupt signals from the servo system controller and by supplying high level control signals, the high level control signals being derived from a program resident in the processor device, the processor device being at least one of a microcontroller having a program in firmware or a computer having a program in software, wherein:

each of the timing error determining circuit, the digital synchronizer and the concurrence determining circuit includes a register having a predetermined value recorded therein, the values controlling an operational aspect of each of the timing error determining circuit, the digital synchronizer and the concurrence determining circuit; and further comprising:

a bus connecting the registers and the processor device to communicate information therebetween; and wherein:

the predetermined values stored in the registers are selectively changeable by communication between the processor device and the registers.

6. A servo system controller as defined in claim 1 for use with a processor device which is operative to control said servo system controller by responding to interrupt signals from the servo system controller and by supplying high level control signals, the high level control signals being derived from a program resident in the processor device, the processor device being at least one of a microcontroller having a program in firmware or a computer having a program in software, wherein:

the timing error determining circuit and the concurrence determining circuit supply the timing error signal and a signal indicative of the threshold not being met, respectively, as interrupt signals to the processor device;

the timing error determining circuit includes a register in which to store a value equal to the amount of variation; and the bus allows communication between the register and the processor device upon the occurrence of the interrupt.

7. A servo system controller as defined in claim 1 wherein the servo field includes a track number code which is defined by a predetermined pattern of Gray coded transitions, further comprising:

a transition pattern decoder responsive to the cell data signals from the digital synchronizer which relate to servo data signals derived from the track number code and operative to determine a Gray code data signal from the cell data signals corresponding to the information of the track number code; and a track number decoder responsive to the Gray code data signal and operative to establish a track number signal therefrom.

8. A servo system controller as defined in claim 7 wherein:

the transition pattern decoder is selectively programmable to respond to a one of a plurality of different Gray codes, and further includes a register in which to store a value representative of the information describing the one of the Gray codes to which it is responsive; and the value in the register is selectively changeable to select a different one of the Gray codes.

9. A servo system controller as defined in claim 8 further comprising:

a track number register connected to the pattern decoder in which to store the value representative of the track number; and a bus connected to the track number register by which to communicate information regarding the track number value.

10. A servo system controller as defined in claim 7 wherein at least one servo field also includes an index mark which is defined by a predetermined pattern of Gray code transitions, further comprising:

an index mark detector responsive to the Gray code signals from the transition pattern decoder and operative to determine an index signal from the Gray code data signals corresponding to the information of the index mark.

11. A servo system controller as defined in claim 1 further comprising:

a sequencer for controlling the timing error determining circuit to determine the amount of variation and to supply the time error signal, the sequencer including an instruction memory containing instructions, an instruction decoder operative to decode the instructions contained in the memory, and a program counter operative to apply address signals to the instruction memory, the instruction memory operative in response to the address signals to supply the instructions to the instruction decoder, the instruction decoder operative in response to the decoded instructions to control the timing error determining circuit to count between corresponding points in the servo field and to control the concurrence determining circuit to determine the degree of concurrence and supply the threshold met signal.

12. A servo system controller as defined in claim 11 further comprising:

a bus connected to the instruction memory by which to communicate information containing the instructions to the memory; and a digital signal processor operative to supply information over the bus to the instruction memory.

13. A servo system controller as defined in claim 11 for use with a processor device which is operative to control said servo system controller by supplying high level control signals, the high level control signals being derived from a program resident in the processor device, the processor device being at least one of a microcontroller having a program in firmware or a computer having a program in software, said servo system controller further comprising:

a switch connected to the bus by which to communicate between the instruction memory and the processor device.

14. A servo system controller as defined in claim 11 further comprising:

an analog to digital (A/D) converter connected to the read/write channel and operative to convert analog signals from the read/write channel to digital form;

an A/D sequencer connected to the A/D converter and operative to sequence the analog signals for conversion by the A/D converter; and wherein:

the instruction decoder is further operative in response to the decoded instructions to control the A/D converter and the A/D sequencer.

15. A servo system controller as defined in claim 14 wherein the servo field includes at least one servo address mark (SAM), a servo synch mark (SSM), an index mark and a track number code which are each defined by a predetermined pattern of transitions representing signals, the index mark and the track number code further being defined by a predetermined pattern of Gray code transitions, further comprising:

a transition pattern decoder responsive to the cell data signals from the digital synchronizer which relate to the track number code and operative to determine a Gray code data signal from the cell data signals corresponding to the information in the track number code; and a track number decoder responsive to the Gray code data signal and operative to establish a track number signal therefrom; and an index mark detector responsive to the Gray code signals from the pattern decoder and operative to determine an index mark signal from the Gray code data signals corresponding to the information in the index mark; and wherein:

the concurrence determining circuit is further operative to supply a SAM detected signal in response to the threshold met signal obtained from cell data signals derived from the SAM and to supply a SSM found signal in response to the threshold met signal obtained from cell data signals derived from the SSM; and the instruction decoder is further operative in response to the decoded instructions to control the A/D converter and the A/D sequencer to control the conversion of the signals obtained from the SAM, SSM, track number code and index mark in a predetermined sequence.

16. A servo system controller for a disk drive device having a rotating mass storage disk with a plurality of tracks having data field and servo field information recorded therein, a head to read information recorded in the servo and data fields, and a read/write channel to supply servo data signals related to the information read by the head, said servo system controller comprising:

a servo decoder responsive to a synch mark signal obtained from corresponding information contained in each sequential servo field of a track and operative to supply a synch mark found signal in response to the occurrence of the information recorded in the track defining the synch mark; and a timing error determining circuit responsive to the synch mark signals and operative to count an actual time duration between sequential synch mark signals, to compare the actual time duration to a predetermined normal time duration between sequential synch marks at desired rotation of the storage disk during normal expected operation of the disk drive device, and to develop a timing error signal related to the difference between the actual time duration and the normal time duration, said timing error determining circuit further including:

a counter operative to count a time duration between predetermined corresponding points in sequential servo fields and operative to supply an output count signal related to the absolute value of the amount of difference between the predetermined normal time duration and the value counted between the predetermined corresponding points in sequential servo fields, the predetermined corresponding points in the sequential servo fields having a predetermined relationship to the synch marks in the sequential servo fields; and a comparator responsive to the output count signal and a predetermined threshold signal which is related to a predetermined maximum threshold amount of time variation between sequential synch marks to obtain reliability in reading and writing data in the data fields, the comparator operative to supply the timing error signal upon the output count signal exceeding the predetermined threshold signal.

17. A servo system controller as defined in claim 16 wherein the counter is a loadable decrementer counter; and the decrementer counter is loaded with a count value equal to the predetermined normal time duration.

18. A servo system controller as defined in claim 16 wherein the timing error determining circuit further comprises:

a latch connected to the counter and operative to receive and hold the output count signal;

a bus connected to the latch and operative to communicate with the latch by which to read the output count signal; and wherein:

the timing error signal indicates an opportunity to read the output count signal from the latch.

19. A servo system controller as defined in claim 16 wherein the timing error determining circuit further comprises:

a register in which to store a threshold value related to the predetermined maximum threshold amount of time;

a bus connected to the register and operative to communicate with the register by which to write different threshold values.

20. A servo system controller as defined in claim 16 wherein the servo field includes a preamble defining the beginning of the servo field and end information defining the end of the servo field, the synch mark following the preamble information and preceding the end information of the servo field, and wherein:

the servo decoder is responsive to the end information and is operative to supply an end signal in response to the occurrence of the end information recorded in the track; and said servo system controller further comprises:

a sequencer responsive to the end signal to establish a timing sequence of a first time period and a second time period, the first time period being of duration equal to a predetermined normal time duration during which the data field will pass relative to the head between sequential servo fields, the second time period being a predetermined normal time duration during which the servo field between the preamble and the synch mark will pass relative to the head, the sequencer supplying a counter enable signal at the end of the first time period; and wherein:

the counter is responsive to the counter enable signal to commence counting and is responsive to the synch mark signal to stop counting, the output count value being established in response to the synch mark signal.

21. A servo system controller as defined in claim 20 wherein:

the sequencer is further operative to establish a third time period of duration equal to a predetermined normal time duration during which the servo field will pass relative to the head between synch mark and the end information, the timing sequence for the first time period is commenced after the end of the timing sequence for the third time period.

22. In a disk drive device having a rotating mass storage disk with a plurality of tracks having servo field information recorded therein, a head to read information recorded in the servo field, and a read/write channel to supply servo data signals related to the information read by the head; an improvement of a digital synchronizer responsive to the servo data signals delivered asynchronously but substantially about a predetermined normal frequency at which the servo data signals would be delivered during desired rotation of the storage disk, comprising:

a clock for supplying a servo clock signal at a frequency which is greater than the predetermined normal frequency of the servo data signals; and a servo data synchronizer responsive to the servo data signals and the servo clock signals and operative to establish a cell data signal related to each servo data signal;

a count value determining circuit responsive to a predetermined number of servo clock signals which constitute a cell, the cell being a predetermined time interval at the predetermined normal frequency for obtaining reliable servo data signals corresponding to the servo field information, the count value determining circuit operative to determine a terminal count value related to the number of servo clock signals which occur until the end of the cell and a load count value related to the number of servo clock signals which occur until the end of the cell from the occurrence of the cell data signal;

a window counter responsive to the servo clock signal, the cell data signal, the terminal count value and the load count value and operative to supply a window signal defining the end of a window during which the servo data signals are reliably accepted;

a parameter determining circuit responsive to the window signal, the terminal count value, the load count value, the number of servo clock signals per cell, and the occurrence of the cell data signal, the parameter determining circuit operative to determine a cell end signal describing the end of the cell; and a cell clock circuit responsive to the servo clock signal and the cell end signal for deriving a cell clock signal which occurs during the cell data signal and during the window and which terminates at least as early as the end of the cell.

23. A digital synchronizer as defined in claim 22 wherein:

the window counter is a reloadable counter;

the window counter is reloaded with the terminal count value at the beginning of a cell; and the window counter is reloaded with the load count value at a time related to the occurrence of the cell data signal.

24. A digital synchronizer as defined in claim 22 wherein:
the predetermined number of servo clock signals which constitute a cell is selectable.

25. A digital synchronizer as defined in claim 22 wherein:
the predetermined number of servo clock signals which constitute a cell is two; and
the cell clock signal has a time width less than one servo clock interval.

26. A digital synchronizer as defined in claim 25 wherein:
the cell ends relative to the occurrence of a servo clock signal; and
the window ends at approximately the end of the cell.

27. A digital synchronizer as defined in claim 23 wherein:
the window counter is a reloadable counter; and
the window counter is loaded with a count value only once per cell, and the count value loaded once per cell is the terminal count value.

28. A digital synchronizer as defined in claim 27 wherein:
the operating characteristic of reloading the counter with either the terminal count value and the load value once per cell or reloading the counter with only the terminal count value once per cell is selectable; and further comprising:
a selection circuit receptive of a signal indicative of the selection of the reloading of the window counter and which is operative to inhibit the window counter from being reloaded with the load count value after the window counter is loaded with the terminal count value at the beginning of a cell.

29. A digital synchronizer as defined in claim 28 for use with a processor device which is operative to control said digital synchronizer by supplying high level control signals derived from a program resident in the processor device, wherein:
the predetermined number of servo clock signals which constitute a cell is selectable; and further comprising:
at least one register having predetermined values recorded therein to control at least one of the predetermined number of servo clock signals per cell or the operating characteristic of reloading the counter;
a bus connecting the registers and the processor device for communication of information therebetween; and wherein:
the predetermined values stored in the registers are selectively changeable by communication between the registers and the processor device over the bus.

30. A digital synchronizer as defined in claim 22 wherein the servo data synchronizer further comprises:
a first clock section and a second clock section responsive to the servo clock signal and operative to clock an input signal applied to each section as an output signal; and
a toggle circuit connected to the first and second clock sections, the toggle circuit responsive to each servo data signal and operative to toggle an output signal related to each servo data signal alternatively to the first and second clock sections as the input signal to the first and second clock sections; and
a logic gate connected to receive the output signal from the first and second sections from which to derive the cell data signal.

31. A digital synchronizer as defined in claim 22 which is included in a servo system controller.

32. A servo system controller for a disk drive device having a rotating mass storage disk with a plurality of tracks, each track having at least one data field with data field information recorded therein and at least one servo field having servo field information recorded therein, the servo field information including at least one field represented by a predetermined pattern of information, a head to read information recorded in the servo and data fields, and a read/write channel to supply servo data signals related to the information read by the head, said servo system controller comprising:
a first register operative to hold a first value corresponding to a first pattern of servo data signals actually detected from reading the servo field information contained in each servo field;
a second register operative to hold a second value corresponding to a second predetermined pattern of signals corresponding to the servo field information actually contained in each servo field recorded on the mass storage disk;
a detection circuit responsive to the first and second values and operative to compare the first and second values and to determine a degree of concurrence between the first and second values compared and to supply a threshold met control signal upon the degree of concurrence exceeding a predetermined threshold.

33. A servo system controller as defined in claim 32 wherein:
the first and second values are multibit signals which have corresponding bits; and
the detection circuit further comprises:
a first comparator operative in response to the first and second values to determine the concurrence between signal levels of corresponding bits of the first and second values and to supply a multibit output signal having bit level signals corresponding to the concurrence of the corresponding bit level signals of the first and second values.

34. A servo system controller as defined in claim 33 wherein the detection circuit further comprises:
a tally circuit responsive to the multibit output signal from the first comparator and operative to add the number of concurrences of corresponding bits of the first and second values represented by the signal levels of the multibit output signal from the first comparator and to supply an sum value representative of the added number of concurrences.

35. A servo system controller as defined in claim 34 wherein the detection circuit further comprises:
a threshold circuit operative to supply a threshold value defining a desired degree of concurrence of the corresponding bit level signals of the first and second values necessary to identify the field, the threshold value representing less than total concurrence; and
a second comparator receptive of the sum value and the threshold value and operative to supply the threshold met signal upon the sum value being equal to or greater than the threshold value.

36. A servo system controller as defined in claim 35 wherein:
the sum value and the threshold value each constitute a multibit sum signal and a multibit threshold value signal, respectively; and
the second comparator is responsive to the sum signal and the threshold value signal to determine the concurrence between the signal levels of corresponding bits of the sum and threshold value signals; and the second comparator is operative to supply the threshold met signal based on the most significant bit of the sum signal which exceeds the corresponding most significant bit of the threshold value signal.

37. A servo system controller as defined in claim 35 wherein the detection circuit further comprises:

a third register of the threshold circuit, the third register operative to hold the threshold value signal; and a bus connected to the third register and operative to communicate with the third register by which to write the threshold value signal into the third register.

38. A servo system controller as defined in claim 37 wherein:

the bus is connected to the first register and the second register and is operative to communicate with the first register and the second register by which to write the first and second values into the first and second register.

39. A servo system controller as defined in claim 37 wherein two fields are included in the servo field, one of the fields defining a servo address mark (SAM) and the other of the fields defining a servo synchronization mark (SSM), and the detection circuit further comprises:

a fourth register of the threshold circuit, the fourth register operative to hold a threshold value to be used for recognizing one of the SAM or the SSM;

a multiplexer connected to the third and fourth registers and operative to supply the threshold value from a selected one of the third or fourth registers to the second comparator; and a control circuit connected to the multiplexer and operative to control the multiplexer to supply the threshold value related to the selected one of the SAM or SSM fields after a threshold met signal has been delivered from recognition of the other one of the SAM or SSM fields.

40. A servo system controller as defined in claim 37 wherein two fields are included in the servo field, and further comprising:

a processor device connected to the bus and operative to supply one threshold value to the third register which is related to the detection of one field prior to the detection of that one field and which is operative to supply another threshold value to the third register which is related to the detection of the other field after detection of the one field and prior to the detection of the other field.

41. A servo system controller for a disk drive device including a rotating mass storage disk with a plurality of tracks having servo field information recorded therein, the servo field including a track number code which is defined by a predetermined pattern of Gray code transitions, a head to read information recorded in the servo field, and a read/write channel for supplying servo data signals related to the information read by the head, said servo system controller comprising:

a digital synchronizer responsive to the servo data signals and operative to establish a regularly occurring cell clock signal, to establish a cell of a time interval for obtaining servo data signals corresponding to the track number code and during which only one servo data signal will occur and in which at least one cell clock signal occurs, and to establish a cell data signal which is related to the one servo data signal and which occurs during the cell, the cell clock signal clocking logical operations associated with the cell data signal in said controller;

a pattern decoder responsive to the cell data signals from the digital synchronizer which relate to servo data signals derived from the track number code and operative to determine a Gray code data signal from the servo data signals corresponding to the information in the track number code;

a track number decoder responsive to the Gray code data signal and operative to establish a track number signal therefrom; and wherein:

the pattern decoder is selectively programmable to respond to a selected one of a plurality of different Gray code schemes:

the pattern decoder includes a divider circuit for determining the number of cells per Gray code unit in accordance with the selected one of the Gray code schemes; and the pattern decoder is responsive to the servo data signals derived from the track number code to supply the Gray code data signals in accordance with the selected one of the Gray code schemes.

42. A servo system controller as defined in claim 41 wherein the servo field also includes an index mark which is defined by a predetermined pattern of Gray code transitions, further comprising:

an index mark detector responsive to the Gray code data signals from the pattern decoder and operative to determine an index signal from the Gray code data signals corresponding to the information in the index mark.

43. A servo system controller as defined in claim 41 wherein:

the pattern decoder further includes a register in which to store a value representative of the selected one of the Gray codes;

the pattern decoder is responsive to the value stored in the register; and the value in the register is selectively changeable to select a different one of the Gray codes.

* * * * *